US007263123B2

(12) United States Patent
Yousef

(10) Patent No.: US 7,263,123 B2
(45) Date of Patent: Aug. 28, 2007

(54) FAST COMPUTATION OF COEFFICIENTS FOR A VARIABLE DELAY DECISION FEEDBACK EQUALIZER

(75) Inventor: Nabil R. Yousef, Foothill Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 907 days.

(21) Appl. No.: 10/390,366

(22) Filed: Mar. 17, 2003

(65) Prior Publication Data

US 2003/0185295 A1  Oct. 2, 2003

Related U.S. Application Data

(63) Continuation-in-part of application No. 10/154,947, filed on May 24, 2002, now Pat. No. 7,113,540, which is a continuation-in-part of application No. 10/044,013, filed on Oct. 26, 2001, now Pat. No. 7,027,504.

(60) Provisional application No. 60/339,253, filed on Oct. 26, 2001, provisional application No. 60/322,994, filed on Sep. 18, 2001.

(51) Int. Cl.
*H03H 7/30* (2006.01)
*H03H 7/40* (2006.01)
*H03K 5/159* (2006.01)

(52) U.S. Cl. ................... 375/233; 375/232; 375/234
(58) Field of Classification Search ........... 375/233, 375/229–236
See application file for complete search history.

(56) References Cited

U.S. PATENT DOCUMENTS

| 5,946,351 A * | 8/1999 | Ariyavisitakul et al. .... 375/233 |
| 6,445,734 B1 * | 9/2002 | Chen et al. ................. 375/231 |
| 6,573,947 B1 * | 6/2003 | Oh ............................. 348/607 |
| 2003/0026333 A1 * | 2/2003 | Murray et al. ............. 375/229 |

FOREIGN PATENT DOCUMENTS

EP   1 248 425 A1   10/2002

OTHER PUBLICATIONS

Kailath, Sayed: "Displacement Structure: Theory and Applications", Siam Review, vol. 37, No. 3, Sep. 1995, pp. 297-386, XP002189613 New York, US, Abstract.

(Continued)

*Primary Examiner*—Curtis B. Odom
(74) *Attorney, Agent, or Firm*—Garlick Harrison & Markison; Bruce E. Garlick

(57) ABSTRACT

Optimal Decision Feedback Equalizer (DFE) coefficients are determined from a channel estimate by casting the DFE coefficient problem as a standard recursive least squares (RLS) problem and solving the RLS problem. In one embodiment, a fast recursive method, e.g., fast transversal filter (FTF) technique, is used to compute the Kalman gain of the RLS problem, which is then directly used to compute MIMO Feed Forward Equalizer (FFE) coefficients. The FBE coefficients are computed by convolving the FFE coefficients with the channel impulse response. Complexity of a conventional FTF algorithm may be reduced to one third of its original complexity by selecting a DFE delay to force the FTF algorithm to use a lower triangular matrix. The length of the DFE may be selected to minimize the tap energy in the FBE coefficients or to ensure that the tap energy in the FBE coefficients meets a threshold.

34 Claims, 15 Drawing Sheets

OTHER PUBLICATIONS

Sailer, Thomas M.: "Decision Feedback Equalization for Powerline and HIPERLAN", Dissertation submitted to the Swiss Federal Institute of Technology, Zurich, for the Degree of Doctor of Technical Sciences, Apr. 11, 2001, pp. 1-126, XP002189615, Zurich, CD, section 3.2.3, section 3.2.5.

Chun, Kailath: "Generalized Displacement Structure for Block-Toeplitz, Toeplitz-block, and Toeplit-derived Matrices", NATO ASI Series, vol. F70, 1991, pp. 215-236, XP000852863, Berlin, DE, ISSN: 0258-1248, section 4D.

Ljung, et al.: "Fast Calculation of Gain Matrices for Recursive Estimation Schemes" International Journal of Control, vol. 27, No. 1, Jan. 1978, pp. 1-19, XP008002548, Basingstoke, GB, the whole document.

Al-Dhahir, Cioffi: "MMSE Decision-Feedback Equalizers: Finite-Length Results", IEEE Transactions on Information Theory, vol. 41, No. 4, Jul. 1995, pp. 961-975, XP002190789, New York, US, the whole document.

Cioffi, Kailath: "Fast, Recursive-Least-Squares Transversal Filters and Adaptive Filtering", IEEE Transactions on Acoustics, Speech and Signal Processing, vol. 32, No. 2, Apr. 1984, pp. 304-337, XP008015403, New York, US, the whole document.

* cited by examiner

FAST COMPUTATION OF COEFFICIENTS FOR A VARIABLE DELAY DECISION FEEDBACK EQUALIZER

CROSS REFERENCES TO RELATED APPLICATIONS

This application is a continuation-in-part of U.S. Regular Utility Application Ser. No. 10/154,947, filed May 24, 2002, now U.S Pat. No. 7,113,540, which claims priority to U.S. Provisional Application Ser. No. 60/339,253, filed Oct. 26, 2001 and which is a continuation-in-part of U.S. Regular Utility Application Ser. No. 10/044,013, filed Oct. 26, 2001, now U.S. Pat. No. 7,027,504, which claims priority to U.S. Provisional Application Ser. No. 60/322,994, filed Sep. 18, 2001. This application claims priority to each of these applications and incorporates herein each of these references in its entirety for all purposes.

FIELD OF THE INVENTION

This invention relates generally to digital communications; and more particularly to decision feedback based equalizers that are employed in digital communication systems.

BACKGROUND OF THE INVENTION

The structure and operation of communication systems is generally known. Many communication systems carry data, e.g., voice, audio, video, file, or other digital data that is sent from a transmitter to a receiver. On the transmitter side, data is first formed into packets. This data may be raw data or encoded data that represents the raw data. Each of these packets also typically includes a header, a known training sequence, and a tail. These packets are then modulated into symbols and the symbols are transmitted by the receiver and intended for receipt by the receiver. The receiver then receives the symbols and attempt to extract the data from the packets that are carried by the symbols.

A "channel" carries the symbols from the transmitter to the receiver. The channel is serviced by a wired, wireless, optical, or another media, depending upon the communication system type. In many communication systems, such as terrestrial based wireless communication systems, satellite based communication systems, cable based communication systems, etc., the channel distorts the transmitted symbols, from the perspective of the receiver, causing interference between a subject symbol and a plurality of symbols surrounding the subject symbol. This type of distortion is referred to as "inter-symbol-interference" and is, generally speaking, the time-dispersed receipt of multiple copies the symbols caused by multipath. The channel also introduces noise into the symbols prior to their receipt. Each of these concepts is well known.

Equalizers are now generally employed in an attempt to remove channel effects from a received symbol stream. Thus, equalizers are essential building blocks of modem receivers, especially in broadband applications where inter-symbol-interference is a critical problem. In a typical equalizer, the channel between the transmitter and the receiver is first estimated based upon the training sequence contained in one or more preambles. Then optimal equalizer coefficients (also referred to as taps and/or tap coefficients for the equalizer) are estimated based upon the channel estimate. The optimal equalizer coefficients are then used by the equalizer in extracting the data from the packet. The optimal equalizer coefficients may also be computed after extraction of the data from the equalized data stream based upon blind channel estimates. Equalizer coefficient generation should be repeated as often as possible, especially in fast varying channel cases, to generate new equalizer coefficients. The received data stream is usually buffered during the period that is required for channel estimation and equalizer coefficient computations. Thus, the preamble (and also actual data) contained in a packet may be used to generate the channel estimate and optimal equalizer coefficients that are employed by the equalizer to extract the data from the packet.

As symbol rates increase and modulation schemes become more complex, equalizers have increasingly greater importance. A critical factor in increasing the effectiveness of these equalizers is the complexity of optimal equalizer coefficient computation. A reduction in this complexity: (1) reduces the memory size required to buffer the received symbol stream sequence during the period required for coefficient computations; (2) allows more frequent uploading of new coefficients thus enabling the equalizer to track fast channel variations; and (3) simplifies the hardware and, resultantly, the die area required for coefficient computation.

FIG. 1 is a block diagram illustrating a discrete time symbol-spaced Decision Feedback Equalizer (DFE) based channel equalization model 100. The channel equalization model 100 includes a channel 102, a Feed Forward Equalizer (FFE) 104, a Decision block 106, and a Feed Back Equalizer (FBE) 108. An input sequence x(n) is complex, independent and identically distributed with unit power. Additive noise v(n) is white Gaussian with power spectral density $\sigma_v^2$. Furthermore, the decisions $\tilde{x}(n-\delta)$ are assumed to be correct, and hence equal to $x(n-\delta)$. This assumption makes the design of the FBE 108 and FFE 104 easier, but at the expense of introducing error propagation due to possibly wrong decisions. The FFE 104 function G(z) has length L. The channel (impulse) response vector of the channel h is given in Equation (1) as:

$$h \triangleq [h(0) h(1) \ldots h(N-1)] \quad \text{Equation (1)}$$

The number of coefficients (taps) M of the FBE 108 function B(z) is assumed greater or equal to the channel memory, i.e., $M \geq N-1$. These modeling assumptions are feasible in practice.

In estimating FFE 104 and FBE 108 equalizer coefficients, the goal is to minimize the mean square error quantity of Equation (2).

$$\zeta = E|x(n-\delta) - \hat{x}(n-\delta)|^2, \quad \text{Equation (2)}$$

where $\hat{x}(n-\delta)$ is the delayed input signal estimate prior to the Decision block 106. By collecting the coefficients of both G(z) and B(z) into vectors, we can express the received signal $\hat{x}(n-\delta)$ in Equation (3) as:

$$x_n = y_n g - \tilde{x}_n b \quad \text{Equation (3)}$$

A channel output model defining $y_n$ may be expressed by:

$$y_n = x_n H + v_n \quad \text{Equation (4)}$$

where H is the (N+L−1)×L convolution matrix corresponding to the channel response and expressed as:

$$H = \begin{bmatrix} h(0) & 0 & \cdots & 0 \\ h(1) & h(0) & \cdots & 0 \\ \vdots & \vdots & \ddots & \vdots \\ h(N-1) & h(N-2) & \ddots & h(0) \\ 0 & h(N-1) & \ddots & h(1) \\ \vdots & \vdots & \ddots & \vdots \\ 0 & 0 & \cdots & h(N-1) \end{bmatrix} \quad \text{Equation (5)}$$

In this model, $x_n$ is the $1 \times (N+L-1)$ input vector, $$x_n \triangleq [x(n)x(n-1) \ldots x(n-N-L+2)] \quad \text{Equation (6)}$$

$y_n$ is the $1 \times L$ input regression vector to the FFE 104, $$y_n \triangleq [y(n)y(n-1) \ldots y(n-L+1)] \quad \text{Equation (7)}$$

$\check{x}_n$ is the $1 \times M$ input regression vector to the (strictly causal) FBE 108, $$\check{x}_n \triangleq [x(n-\delta-1)x(n-\delta-2) \ldots x(n-\delta-M)] \quad \text{Equation (8)}$$

and $v_n$ is the $1 \times L$ vector noise process.

The current efficient methods for computing the optimal filter coefficients of a decision feedback equalizer, which optimizes (2), are based on the well-known Cholesky decomposition method (from a finite-dimension problem formulation). Two published papers: (1) N. Al-Dhahir and J. M. Cioffi, "MMSE Decision-Feedback Equalizers: Finite-Length Results," IEEE Trans. on Information Theory, vol. 41, no. 4, pp. 961-973, July 1995; and (2) N. Al-Dhahir and J. M. Cioffi, "Fast Computation of Channel-Estimate Based Equalizers in Packet Data Transmission," IEEE Trans. on Signal Processing, vol. 43, no. 11, pp. 2462-2473, November 1995 provide one procedure for computing optimal DFE settings. These equations are referred to hereinafter as "Al-Dhahir's equations."

Generally speaking, Al-Dhahir's equations, as well as other existent techniques rely on the use of the generalized Schur algorithm for fast Cholesky decomposition of the matrices involved in both the FBE and FFE optimal coefficient setting computations. However, the overall procedures for calculation of the DFE (FBE and FFE) coefficients have the following problems:

1. These procedures require the use of nonstructured recursive equations. These equations are difficult to implement from the perspective of integrated circuit design. In particular, the recursive equations used in Al-Dhahir's DFE tap (coefficient) computer often requires the use of a DSP processor. As is generally known, the use of a DSP processor in a real-time communication system application severely constricts system throughput.

2. These procedures, in particular Al-Dhahir's equations, require a complex tap computer. In other words, they require the use of a relatively large number of complex multiplies.

3. These prior art DFE coefficient computation techniques can be used only for equalizers that use a fixed equalizer delay ($\delta$), which is set to its maximum value $L-1$, where L is the length of the FFE 104. The prior art techniques cannot use a different delay $\delta$ of the equalizer.

Additional difficulties relate to the operation of FFEs, and the computation of FFE coefficients where the channel being equalized has a long pre-echo (precursor components). The problem arises from the modeling restriction that the total channel/equalizer delay be less than the FFE length. While this restriction enables the derivation of fast computation of the FBE taps, such as with Al-Dhahir's equations, this restriction results in FBE taps greater than one, which causes the DFE to be unstable.

Thus, there is a need in the art for an equalizer coefficient computation methodology and system in which such methodology may be implemented.

SUMMARY OF THE INVENTION

In order to overcome the above-cited shortcomings, among others of the prior art, the method and system of the present invention computes optimal Decision Feedback Equalizer (DFE) coefficients $\{g_{opt}, b_{opt}\}$ from a channel estimate h. As contrasted to the prior art, the methodology of the present invention relies on iterating simple structured recursions to yield the DFE coefficients. Resultantly, the operation according to the present invention produces DFE coefficients faster and with less computational requirements than the prior art operations, thus providing significant advantages over prior techniques.

According to the present invention, a channel impulse response h is first estimated based upon either a known training sequence or an unknown sequence. A solution to the DFE coefficient computation problem is then cast as a standard recursive least squares (RLS) problem. More specifically, the solution for Feed Forward Equalizer (FFE) coefficients $g_{opt}$ (of the DFE) based upon the channel impulse response h is formulated as the Kalman gain solution to the RLS problem. A fast recursive method for computing the Kalman gain is then directly used to compute $g_{opt}$.

In one embodiment of the present invention, a fast transversal filter (FTF) technique is employed to compute $g_{opt}$. In this embodiment, the complexity of a conventional FTF algorithm is reduced to one third of its original complexity by choosing the length of Feed Back Equalizer (FBE) coefficients $b_{opt}$ (of the DFE) to force the FTF algorithm to use a lower triangular matrix. This technique significantly reduces the needed recursions and computations, as well as avoiding finite precision problems of a conventional FTF solution implemented in hardware.

Finally, with the FFE coefficients $g_{opt}$ determined, the FBE coefficients $b_{opt}$ are computed by convolving the FFE coefficients $g_{opt}$ with the channel impulse response h. In performing this operation, a convolution matrix that characterizes the channel impulse response h is extended to a bigger circulant matrix. With the extended circulant matrix structure, the convolution of the FFE coefficients $g_{opt}$ with the channel impulse response h may be performed the convolution operations in a transformed domain. In one embodiment, the convolution is performed in the frequency domain, which can be computed efficiently using the Fast Fourier Transform (FFT). However, in other embodiments, other transformation domains are employed for the convolution operations, e.g., Discrete Cosine Transformation domain and the Discrete Hadamard Transform domain, among others.

According to one aspect of the present invention, solving the least squares problem to yield Feed Forward Equalizer (FFE) coefficients of the DFE coefficients includes: (1) selecting a delay of the DFE; (2) when the delay is less than or equal to a number of taps of the FFE minus one, performing a first set of operations; and (3) when the delay is greater than the number of taps of the FFE minus one, performing a second set of operations. Generally, this aspect of the present invention "frees" the restriction of the channel/equalizer delay, enables a fast DFE tap computation algorithm, and also results in a FBE coefficient solution with a long delay (longer than the FFE length). This technique is performed at the lowest possible increase in complexity in the DFE tap computation algorithm. With a delay greater than the FFE length, it turns out that the computation iterates forward prediction recursions as well as backward prediction recursions. The algorithm is recursive with D iterations (i=1 to D). For i<FFE length (L), only forward prediction recursions are iterated. For i=L to D, both forward and backward recursions are iterated. For the first L iterations, 3L multiplies/iteration are required. For the last (D-L) iterations, the complexity is 5L multiplies/iteration. Thus the total complexity is [3L²+5L (D-L)] multiplies.

With the constraint of fixed FBE delay removed, however, it is now required to select a FBE delay. Thus, another aspect of the present invention focuses on determining the FBE delay. According to one operation of the present invention determining the delay of the DFE includes determining a delay of the channel based upon the channel response of the channel and adding the delay of the channel to the number of taps of the FFE minus one to produce the delay of the DFE. In this operation, the delay of the channel may be selected as the length of the precursor of the channel response.

Another technique for determining the delay of the DFE according to the present invention considers the tap energy in the FBE coefficients. One embodiment of this technique includes: (1) calculating a plurality of sets of FFE coefficients and FBE coefficients, wherein each of the plurality of sets of FFE coefficients and FBE coefficients corresponds to a respective DFE delay and (2) selecting one of the plurality of sets of FFE coefficients and FBE coefficients based upon the tap energy of the respective FBE coefficients. With this embodiment, in selecting one of the plurality of sets of sets of coefficients includes selecting a set of FFE coefficients and FBE coefficients that meets an FBE coefficient tap energy threshold. In an alternate operation, selecting one of the plurality of sets of sets of coefficients includes selecting a set of FFE coefficients and FBE coefficients that provides a minimum FBE coefficient tap energy.

The method of the present invention is exact and is much faster than any prior technique that may have been employed to compute DFE coefficients for the same channel and DFE filter lengths. Because the method of the present invention relies upon simple structured recursion, the computation period and/or the hardware required for the DFE coefficient computations is significantly reduced as compared to prior art implementations. The reduction in computation complexity and resultant increase in computation speed enables a DFE that operates according to the present invention to track fast channel variations.

The method of the preset invention may be efficiently used in many communication systems that require the use of equalizers such as mobile wireless receivers, fixed wireless receivers, cable modem receivers, HDTV receivers, etc. to increase the performance of such communication systems. Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION

Figure 1:
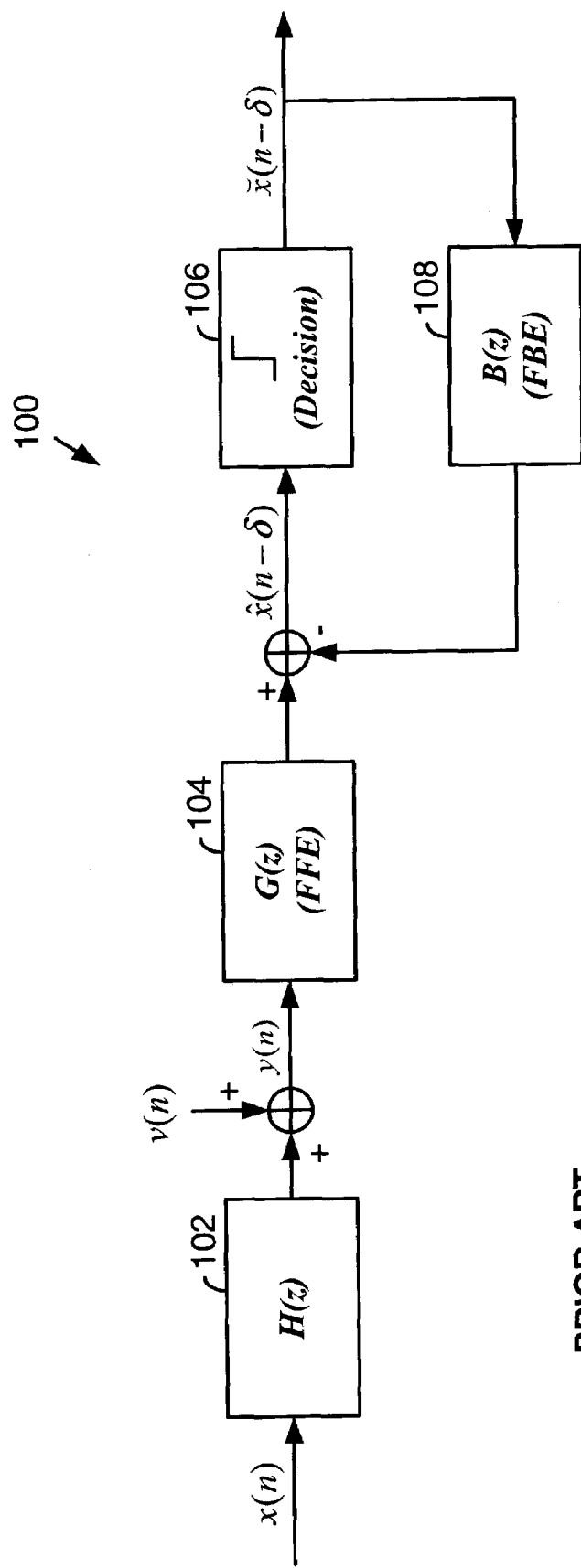
FIG. 1 is a block diagram illustrating a discrete time symbol-spaced Decision Feedback Equalizer (DFE) channel equalization model 100.
Figure 2:
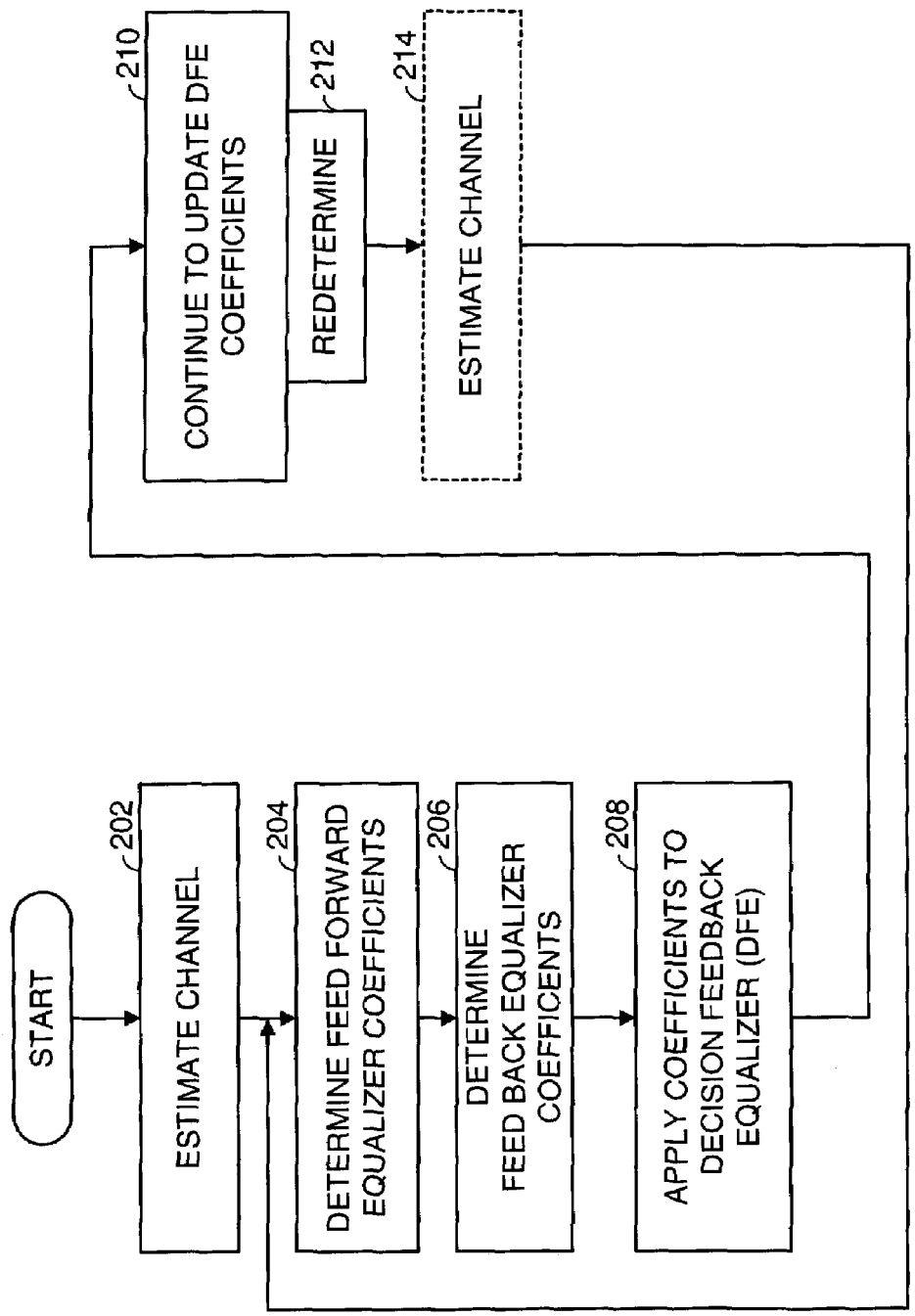
FIG. 2 is a logic diagram generally illustrating operation according to the present invention in determining DFE coefficients and applying such coefficients to a DFE.

FIG. 2 is a logic diagram generally illustrating operation according to the present invention in determining Decision Feedback Equalizer (DFE) coefficients and in applying such coefficients to a DFE. The operations of the present invention are performed by a processor, such as a Digital Signal Processor (DSP), or other circuitry present within a receiver that determines DFE coefficients to be applied to a DFE, also resident in the receiver. The DFE operates upon samples of a received signal in an attempt to remove channel effects from the samples so that digital data may be extracted from the samples. The structure and operation of DFEs, one of which was illustrated in FIG. 1, are generally known and will not be further described herein except as they relate to the present invention.

A processor, tap computer, DSP, or other receiver device, to determine initial DFE coefficients to be used in subsequent operations by the receiver, will first perform the operations of the present invention. Thus, during startup or reset, a channel corresponding to the receiver is estimated (step 202). According to one embodiment of the present invention, the channel is estimated based upon a known preamble sequence. However, in other embodiments, the channel could also be estimated based upon unknown received data. In either case, channel estimation operations are generally well known and are not described further herein except as it relates to the present invention.

With the channel estimated, Feed Forward Equalizer (FFE) coefficients are determined based upon the channel estimate (step 206). Then, Feed Back Equalizer (FBE) coefficients are determined based upon the FFE coefficients and the channel estimate (step 208). The manner in which the FFE and FBE coefficients are generated is step 206 and step 208 will be described in detail herein with reference to FIGS. 3-7.

With the FFE and FBE coefficients determined, they are applied to the DFE (step 208) and are used in equalizing samples of a received signal to remove channel effects. These DFE coefficients are continually updated (step 210) using a known technique. Periodically, upon the receipt of a next packet for example, upon an indication that a new determination is required, or upon another triggering event, the DFE coefficients are again determined (step 212). In this event, another channel estimate may be obtained (step 214). Then, the DFE coefficients are again determined according to the present invention and applied to the DFE. The operations of FIG. 2 continue until the receiver is turned off, placed in a sleep mode, or otherwise inactivated.

Figure 3:
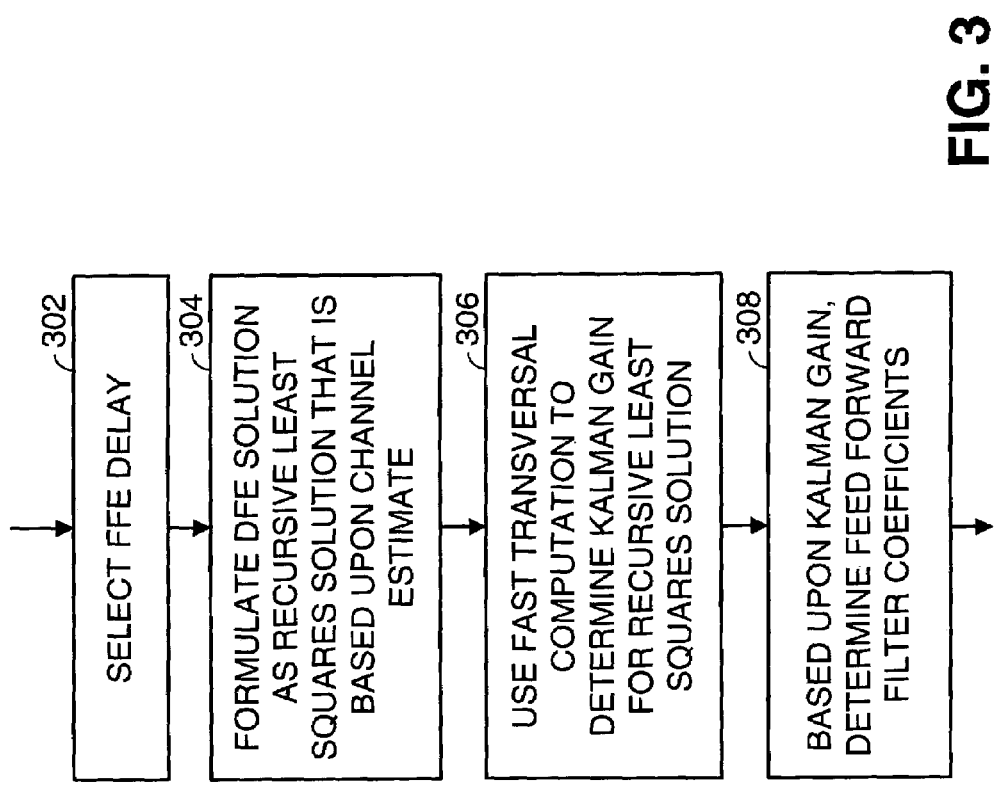
FIG. 3 is a logic diagram illustrating operations according to the present invention employed to determine Feed Forward Equalizer (FFE) coefficients for the DFE.

FIG. 3 is a logic diagram illustrating operations according to the present invention employed to determine Feed Forward Equalizer (FFE) coefficients for the DFE. In a first operation of FIG. 3, a DFE delay is selected (step 302). In one embodiment, this delay is selected as the channel length. In such case, the DFE delay corresponds to the length of the FFE.

Next, the DFE solution is formulated into a least squares solution (step 304). By collecting the FFE coefficients g and the FBE coefficients b into a single vector w, the minimization of the Mean Square Error may be written as:

$$\min_w E \left| x(n-\delta) - \underbrace{[y_n \; -\breve{x}_n]}_{u} \underbrace{\begin{bmatrix} g \\ b \end{bmatrix}}_{w} \right|^2 \quad \text{Equation (9)}$$

Now, denoting $R_u$ the variance of the augmented input regression vector u, and cross variance $R_{ux(n-\delta)}$, the well-known solution to this smoothing problem is given by Equation (10) as:

$$w_{opt} = R_u^{-1} R_{ux(n-\delta)}. \quad \text{Equation (10)}$$

where $$R_u \triangleq E\begin{bmatrix} y_n^* \\ -\breve{x}_n^* \end{bmatrix}[y_n \; -\breve{x}_n] = \begin{bmatrix} R_y & -R_{y\breve{x}} \\ -R_{\breve{x}y} & R_{\breve{x}} \end{bmatrix} \quad \text{Equation (11)}$$

and $$R_{ux(n-\delta)} = \begin{bmatrix} Ey_n^* x(n-\delta) \\ E\breve{x}_n^* x(n-\delta) \end{bmatrix} = \begin{bmatrix} R_{yx(n-\delta)} \\ R_{\breve{x}x(n-\delta)} \end{bmatrix} \quad \text{Equation (12)}$$

Using the channel output model of Equation (4), and the fact that x(n) is individually identically distributed (i.i.d.), the following closed form expressions for $\{R_y, R_{y\breve{x}}, R_{\breve{x}}, R_{yx(n-\delta)}, R_{\breve{x}x(n-\delta)}\}$ are determined:

$$R_y = Ey_n^* y_n = \sigma_v^2 I + H^* H \quad \text{Equation (13)}$$

$$R_{y\breve{x}} = H^*(Ex_n^* \breve{x}_n) = H^* \begin{bmatrix} 0_{(\delta+1) \times M} \\ I_M \\ 0_{(N+L-M-\delta) \times M} \end{bmatrix} \triangleq \overline{H}^*, \quad \text{Equation (14)}$$

$$R_{\breve{x}} = I_M \quad \text{Equation (15)}$$

$$R_{yx(n-\delta)} = H^* Ex_n^* x(n-\delta) = H^*[0_{1 \times \delta} \; 1 \; 0]^T \triangleq h^* \quad \text{Equation (16)}$$

$$R_{\breve{x}x(n-\delta)} = 0 \quad \text{Equation (17)}$$

where $\overline{H}$ is a submatrix of H as set forth in Equation (5), $$H = \begin{bmatrix} H_1 \\ \overline{H} \\ H_2 \end{bmatrix} \quad \text{Equation (18)}$$

$H_1$ is defined as the $(\delta+1) \times L$ submatrix of H, consisting of the first $(\delta+1)$ rows of H. Note that for the case of colored noise, the matrix $\sigma_v^2 I$ should be replaced by the autocorrelation matrix of the noise $R_v$. Extending the derivation to the colored noise case is straightforward.

Now, with the quantities defined above, Equation (10) becomes:

$$w_{opt} = \begin{bmatrix} \sigma_v^2 I + H^* H & -\overline{H}^* \\ -\overline{H} & I \end{bmatrix}^{-1} \begin{bmatrix} h^* \\ 0 \end{bmatrix} \quad \text{Equation (19)}$$

Using the well known inverse formula of block matrices, $w_{opt}$ may be rewritten as:

$$w_{opt} = \left(\begin{bmatrix} 0 & 0 \\ 0 & I \end{bmatrix} + \begin{bmatrix} I \\ \overline{H} \end{bmatrix}(\sigma_v^2 I + H^* H - \overline{H}^* \overline{H})^{-1}[I \; \overline{H}]\right)\begin{bmatrix} h^* \\ 0 \end{bmatrix} \quad \text{Equation (20)}$$

and as:

$$= \begin{bmatrix} I \\ \overline{H} \end{bmatrix}(\sigma_v^2 I + H_1^* H_1 + H_2^* H_2)^{-1} h^* \quad \text{Equation (21)}$$

which may be written as:

$$\begin{bmatrix} g_{opt} \\ b_{opt} \end{bmatrix} = \begin{bmatrix} I \\ \overline{H} \end{bmatrix}\left(\sigma_v^2 I + [H_1^* \; H_2^*]\begin{bmatrix} H_1 \\ H_2 \end{bmatrix}\right)^{-1} h^* \quad \text{Equation (22)}$$

Although each of the two matrices $H_1$ and $H_2$ has a shift structure, the augmented matrix $$\begin{bmatrix} H_1 \\ H_2 \end{bmatrix}$$

does not have a shift structure.

In selecting the length of the FBE (DFE delay) to be $M \geq N-1$, the quantities $h_\delta$, $H_1$ and $H_2$ are such that:

$$\begin{bmatrix} H_1 \\ H_2 \end{bmatrix} = \begin{bmatrix} H_\delta & 0 \\ 0 & \tilde{H} \end{bmatrix} \quad \text{Equation (23)}$$

and $$h = [h_\delta \ 0] \quad \text{Equation (24)}$$

This implies that:

$$\sigma_v^2 I + H_1^* H_1 + H_2^* H_2 = \begin{bmatrix} \sigma_v^2 I + H_\delta^* H_\delta & 0 \\ 0 & \sigma_v^2 I + \tilde{H}^* \tilde{H} \end{bmatrix} \quad \text{Equation (25)}$$

is block diagonal. In this case, the expressions for $g_{opt}$ and $b_{opt}$ decouple into a simple form.

Therefore, the optimal FFE and FBE coefficients are represented as:

$$g_{opt} = (\sigma_v^2 I = H^*_\delta H_\delta)^{-1} h^*_\delta \quad \text{Equation (26)}$$

$$b_{opt} = \bar{H} g_{opt} \quad \text{Equation (27)}$$

The above expressions are valid for all values of the DFE delay $\delta$. In general, the optimal value for the DFE delay $\delta$ is within the range $L-1 \leq \delta_{opt} \leq N+L-2$. In the special case of the choice $\delta = L-1$, the matrices involved in the above expressions are given by $$H_\delta = \begin{bmatrix} h(0) & 0 & \cdots & 0 \\ h(1) & h(0) & \cdots & 0 \\ \vdots & \vdots & \ddots & \vdots \\ h(N-1) & h(N-2) & \cdots & h(0) \end{bmatrix}, \quad \text{Equation (28)}$$

$$h_\delta^* = \begin{bmatrix} h^*(N-1) \\ h^*(N-2) \\ \vdots \\ h^*(0) \end{bmatrix}$$

and $$\bar{H} = \begin{bmatrix} 0 & h(N-1) & \cdots & h(1) \\ 0 & 0 & \ddots & h(2) \\ \vdots & \vdots & \ddots & \vdots \\ 0 & 0 & \cdots & h(N-1) \end{bmatrix} \quad \text{Equation (29)}$$

Note that this solution is equivalent to the solution of Al-Dhahir's equations, due to the uniqueness of $w_{opt}$ when Equation (2) is minimized. However, the expressions obtained above for Equations (26) and (27) provide alternative methods to compute the FFE and FBE coefficients $g_{opt}$ and $b_{opt}$ in a simpler and more efficient way than the prior art techniques.

In calculating $g_{opt}$, a coefficient matrix is first defined in Equation (30) as:

$$P_\delta \triangleq (\sigma_v^2 I + H_\delta^* H_\delta)^{-1} \quad \text{Equation (30)}$$

so that the optimal solution for the FFE coefficients $g_{opt}$ is given by $$g_{opt} = P_\delta h_\delta^*. \quad \text{Equation (31)}$$

The expression for $g_{opt}$ corresponds exactly to the definition of the Kalman gain vector, used to update the optimal weights in a certain regularized Recursive Least Squares (RLS) problem. More specifically, given a $(n+1) \times L$ data matrix $H_n$ and the corresponding coefficient matrix $P_n$, the Kalman gain $g_n = P_n h_n^*$ can be time-updated according to the following recursions:

$$\gamma^{-1}(n) = 1 + h_n P_{n-1} h_n^*, \quad \text{Equation (32)}$$

$$g_n = P_{n-1} h_n^* \gamma(n), \quad \text{Equation (33)}$$

$$P_n = P_{n-1} - g_n \gamma^{-1}(n) g_n^*, \quad \text{Equation (34)}$$

where $P_{-1} = \sigma_v^{-2} I$ (the term $P_{-1}$ is the initial condition for $P_n$) and $g_0 = 0$. The computation of the Kalman gain vector $g_{n+1}$ in the above solution relies on the propagation of the Riccati variable $P_n$. This method of computation requires $O(L^2)$ operations per iteration.

Well known fast RLS schemes avoid the propagation of $P_n$ and compute the gain $g_n$ in a more efficient way. In this case, the computational complexity required is only of $O(L)$ per iteration. This implies that the overall complexity needed to calculate the FFE coefficients is on the order of $O(L^2)$ thus yielding an efficient method for computing the FFE coefficients. Therefore, fast RLS filters are used to determine $g_{opt}$. In such case, fast transversal computations are employed to determine the Kalman gain for the RLS solution (step 306). Here we also note that it is straightforward to extend this method to use other fast RLS algorithms, e.g., array form fast RLS algorithms.

Faster recursions may be obtained by selecting the FBE length. Such selection eliminates certain variables that remain constant and equal to zero during adaptations in the special solution for $g_{opt}$. Fast RLS recursion in its explicit form propagates $g_n$ in an efficient manner, see, e.g.: [1] Ljung, M. Morf, and D. Falconer, "Fast calculation of gain matrices for recursive estimation schemes," Int. J. Contr. vol. 27, pp. 1-19, January 1978); [2] G. Carayannis, D. Manolakis, and N. Kalouptsidis, "A fast sequential algorithm for least squares filtering and prediction," IEEE Trans. on Acoustic., Speech, Signal Proc., vol. ASSP-31, pp. 1394-1402, December 1983; and [3] J. Cioffi and T. Kailath, "Fast recursive-least-squares transversal filters for adaptive filtering," IEEE Trans. on Acoust., Speech Signal Processing, vol. ASSP-32, pp. 304-337, April 1984.

Table 1 lists the fast recursions employed in one embodiment for computing the normalized Kalman gain. The additional index included in $k_{L,n}$ and $\gamma_L(n)$ stems from the fact that these quantities admit an order-update relation, instead of time-update.

TABLE 1

Fast Transversal Computation of the Kalman gain.

Initialization $\xi^f(-1) = \xi^b(0) = \sigma_v^2$ $w_{-1}^f = w_0^b = k_0 = 0$ $\gamma_L(0) = 1$ For n = 0 to $\delta$ repeat operations (1) to (13):

(1) $\alpha_L(n-1) = h(n) - h_{n-1} w_{n-2}^f$ (2) $f(n-1) = \gamma_L(n-1) \alpha(n-1)$ TABLE 1-continued Fast Transversal Computation of the Kalman gain.

(3) $k_{L+1,n-1} = \begin{bmatrix} 0 \\ k_{L,n-1} \end{bmatrix} + \frac{\alpha*(n-1)}{\zeta^f(n-2)} \begin{bmatrix} 1 \\ -w_{n-2}^f \end{bmatrix}$ (4) $\zeta^f(n-1) = \zeta^f(n-2) + \alpha*(n-1)f(n-1)$ (5) $w_{n-1}^f = w_{n-2}^f + k_{L,n-1}f(n-1)$ (6) $\gamma_{L+1}(n) = \gamma_L(n-1)\frac{\zeta^f(n-2)}{\zeta^f(n-1)}$ (7) $v(n) = $ (last entry of $k_{L+1,n-1}$)

(8) $k_{L,n} = k_{L+1,n-1}(1:L) + v(n)w_{n-1}^b$ (9) $\beta(n) = \zeta^b(n-1)v^*(n)$

(10) $\gamma_L(n) = \frac{\gamma_{L+1}(n)}{1 - \gamma_{L+1}(n)\beta_L(n)v_L(n)}$

(11) $b(n) = \gamma_L(n)\beta_L(n)$

(12) $\zeta^b(n) = \zeta^b(n-1) + \beta^*(n)b(n)$

(13) $w_n^b = w_{n-1}^b + k_{L,n}b(n)$

Set $g_{opt} = k_{L,\delta}\gamma_L(\delta)$.

The purpose of computing $k_n$ in the well-known FTF algorithm is to use it in the computation of the corresponding optimal least squared solution for the FFE coefficients. Because we are interested only in $k_n$, the filtering part of the FTF algorithm is not necessary, and does not appear in the algorithm listing.

The quantities $\{w_n^f, w_n^b\}$ are known as the least-squares solutions of the forward and backward prediction problems of order L, with corresponding residual errors $\{f(n), b(n)\}$. Now, because during the first L iterations, the desired signal for the backward prediction problem is equal to zero, the backward least squares solution $w_n^b$ will be equal to zero. This means that all quantities associated with the backward prediction problems will remain nulls for the first L iterations. Since in our case the optimal solution is achieved exactly at the L-th iteration, we can simply rule out the computation of these quantities from Table 1. These operations correspond to operations (7) and (9) through (13) of Table 1. Note that operation (10) of Table 1 is also eliminated, since $\beta(n)=0$, which implies $\gamma_L(n)=\gamma_{L+1}(n)$. This means that we can replace operation (6) of Table 1 with:

$$\gamma_L(n) = \gamma_L(n-1)\frac{\zeta^f(n-2)}{\zeta^f(n-1)}, \quad \text{Equation (35)}$$

which can be further simplified since $$\gamma_L(n) = \frac{\zeta^f(-1)}{\zeta^f(0)}\frac{\zeta^f(0)}{\zeta^f(1)} \cdots \frac{\zeta^f(n-2)}{\zeta^f(n-1)} = \frac{\sigma_v^2}{\zeta^f(n-1)} \quad \text{Equation (36)}$$

Moreover, operation (8) of Table 1 becomes simply $$k_{L,n} = k_{L+1,n-1}(1:L). \quad \text{Equation (37)}$$

where (1:L) denotes the first L entries of $k_{L+1,n-1}$

Table 2 illustrates a simplified fast recursion for computing the optimal FFE coefficients $g_{opt}$.

TABLE 2

Fast Transversal Computation of the FFE coefficients.

Initialization $\zeta^f(-1) = \sigma_v^2$ $w_{-1}^f = k_{L,0} = 0$ $\gamma(0) = 1$ For n = 0 to δ repeat operations (1) through (7):

(1) $\alpha_L(n-1) = h(n) - h_{n-1}w_{n-2}^f$ (2) $f(n-1) = \gamma(n-1)\alpha(n-1)$ (3) $k_{L+1,n-1} = \begin{bmatrix} 0 \\ k_{L,n-1} \end{bmatrix} + \frac{f*(n-1)}{\sigma_v^2}\begin{bmatrix} 1 \\ -w_{n-2}^f \end{bmatrix}$ (4) $\zeta^f(n-1) = \zeta^f(n-2) + \alpha*(n-1)f(n-1)$ (5) $w_{n-1}^f = w_{n-2}^f + k_{L,n-1}f(n-1)$ (6) $\gamma(n) = \frac{\sigma_v^2}{\zeta^f(n-1)}$ (7) $k_{L,n} = k_{L+1,n-1}(1:L)$ Set $g_{opt} = k_{L,\delta}\gamma(\delta)$ With the Kalman gain determined, the FFE coefficients are then determined (step 308). In the recursions of Table 2, the FFE coefficients are determined by setting $g_{opt}=k_{L,\delta}\gamma(\delta)$ when the number of iterations, n, is equal to the DFE delay.

Unlike the conventional weighted FTF algorithm, the above recursions do not face finite precision difficulties for the following reasons. First, by ruling out the equations associated with the backward prediction problem, we are automatically eliminating many of the recursive loops that are responsible for the finite precision difficulties of the full FTF algorithm. Second, these simplified fast recursions have a forgetting factor λ=1, which yields finite precision stability. Third, the simplified algorithm deals with a finite set of data (δ+1 iterations). This algorithm is then reset, which avoids the accumulation of finite precision errors.

Figure 4:
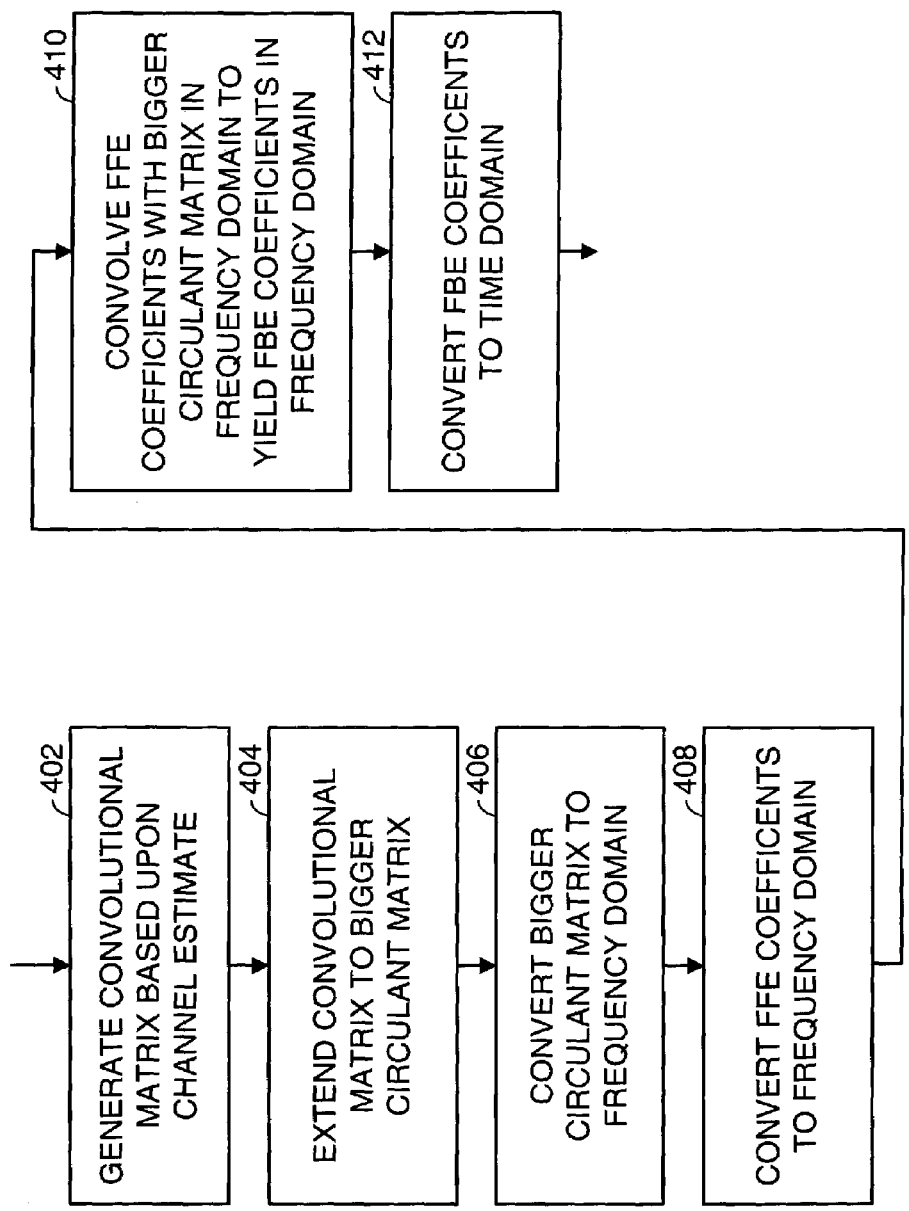
FIG. 4 is a logic diagram illustrating operations according to the present invention employed to determine Feed Back Equalizer (FBE) coefficients for the DFE.

FIG. 4 is a logic diagram illustrating operations according to the present invention employed to determine Feed Back Equalizer (FBE) coefficients for the DFE. The FBE coefficients $b_{opt}$ are determined according to the matrix-vector product of Equation (27). The computation of the feedback filter coefficients simply amounts to convolution of the channel impulse response with $g_{opt}$. The convolution operation that defines the optimal FBE coefficients in Equation (27) can be computed directly with LM/2 multiplications.

Alternatively, the operations may also be efficiently performed using well-known fast FFT convolution techniques.

To illustrate such operations, Equation (29) is first rewritten in Equation (38) as:

$$b_{opt} = \begin{bmatrix} I_M & 0 \end{bmatrix} \begin{bmatrix} \overline{H} & H_3 \\ H_4 & H_5 \end{bmatrix} \begin{bmatrix} g_{opt} \\ 0 \end{bmatrix}, \quad \text{Equation (38)}$$

The above equality holds true regardless of the values of $H_3$, $H_4$, or $H_5$. Now, if these values are chosen such that the matrix C, defined by:

$$C = \begin{bmatrix} \overline{H} & H_3 \\ H_4 & H_5 \end{bmatrix}. \quad \text{Equation (39)}$$

is a square (Q×Q) circulant matrix, where Q is the smallest power-of-two integer larger than or equal M+L. In this case, the matrix C is rewritten in Equation (40) as:

$$C = F^* \Lambda F, \quad \text{Equation (40)}$$

where F is a (Q×Q) FFT matrix and $\Lambda$ is a diagonal matrix that contains the elements of the FFT of the first row of C. The solution for $b_{opt}$ becomes:

$$b_{opt} = \begin{bmatrix} I_M & 0 \end{bmatrix} F^* \Lambda F \begin{bmatrix} g_{opt} \\ 0 \end{bmatrix}, \quad \text{Equation (41)}$$

The complexity of this method is the complexity of obtaining the FFT of two vectors of Q elements of each, the inverse FFT of another Q element vector, and Q complex multiples. Thus the overall complexity is $$Q + 3Q \log_2(Q). \quad \text{Equation (42)}$$

For the case of a power-of-two channel estimate N, the complexity is $$2M + 6M \log_2(2M). \quad \text{Equation (43)}$$

Thus, referring again to FIG. 4, in determining the FBE coefficients, the convolutional matrix $\overline{H}$ is first determined (step 402). As was previously described, the matrix $\overline{H}$ may be determined as part of the channel estimation. Then, the convolutional matrix $\overline{H}$ is extended to form the bigger circulant matrix C (step 404). The bigger circulant matrix C is then converted to the Frequency domain (step 406) as are the FFE coefficients (step 408). With both the bigger circulant matrix C and the FFE coefficients in the frequency domain, they are convolved in the frequency domain by simple matrix multiplication (step 410) to produce the FBE coefficients $b_{opt}$. Finally, the resultant FBE coefficients $b_{opt}$ are then converted to the time domain using inverse FFT operations to produce FBE coefficients $b_{opt}$ in the time domain (step 412). The FBE coefficients $b_{opt}$ are then applied with the FFE coefficients $g_{opt}$ to the DFE (as previously described with reference to FIG. 2.

Figure 5:
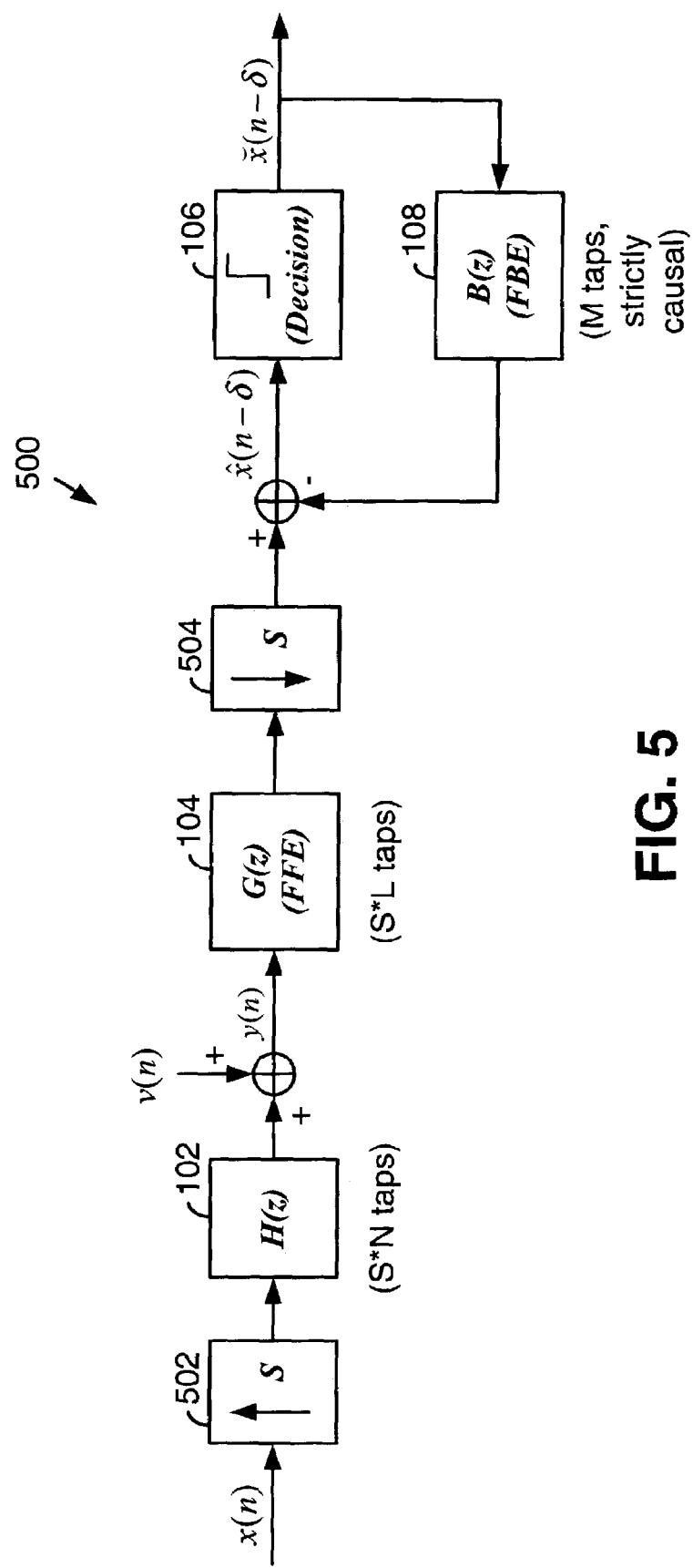
FIG. 5 is a block diagram illustrating a discrete time fractionally-spaced DFE that operates according to the present invention.
Figure 6:
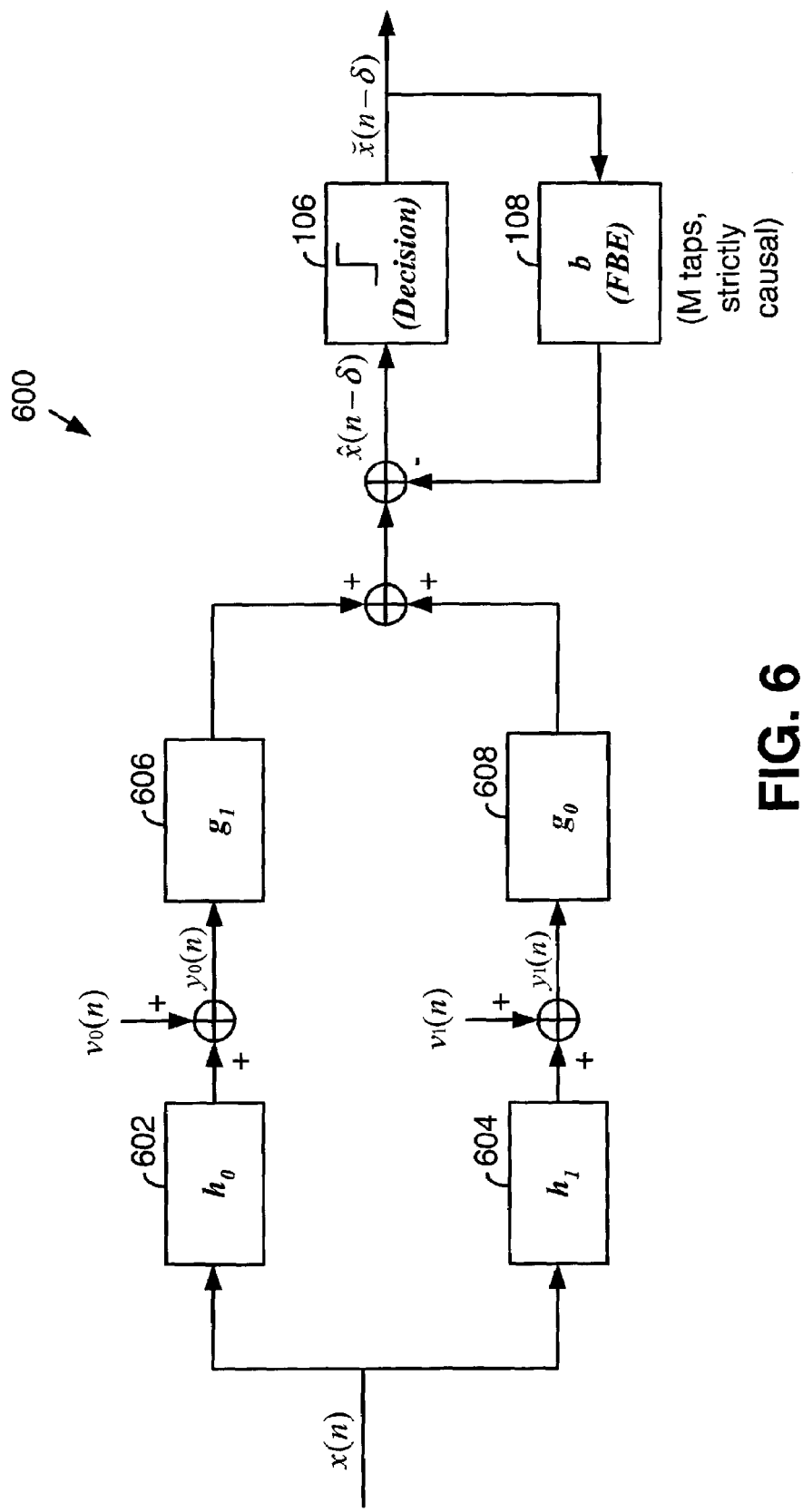
FIG. 6 is a block diagram illustrating a multi-channel equivalent of the discrete time fractionally-spaced DFE of FIG. 5.

FIG. 5 is a block diagram illustrating a discrete time fractionally-spaced DFE that operates according to the present invention. FIG. 6 is a block diagram illustrating a multi-channel equivalent of the discrete time fractionally-spaced DFE of FIG. 5. The approach used for the symbol-spaced model can be easily extended to fractionally spaced models. In this section, we shall derive a fast algorithm for a T/2-spaced equalizer. The fast solution for the general case of faster over sampling factors, say T/3, T/4, . . . , etc. will then follow simply by inspection of the arguments in this section.

FIGS. 5 and 6 illustrate two equivalent representations for a discrete time model of a T/2-spaced equalizer. FIG. 5 illustrates a DFE 500 in terms of a down sampler and an up sampler device, while FIG. 6 illustrates a DFE 600 is a corresponding multichannel representation. Thus, as contrasted to FIG. 1, the DFE 500 of FIG. 5 includes a down sampler 502 and an up sampler 504 that alter the sampling frequency. Further, the DFE 600 of FIG. 6 includes a first channel function 602 having channel estimate $h_0$ and corresponding noise function $v_0(n)$ and FFE 606 coefficients $g_0$. Likewise, the DFE 600 of FIG. 6 also includes a second channel function 604 having channel estimate $h_1$ and corresponding noise function $v_1(n)$ and FFE 608 coefficients $\{g_0, g_1\}$.

The equivalence between the structures of FIG. 5 and FIG. 6 can be easily verified by writing each of the quantities $\{h.g\}$ and $v(n)$ in terms of their polyphase components, and interchanging their position with the down sampler and the up sampler (see, e.g., P. P. Vaidyanathan, "Multirate Systems and Filter Banks," Prentice Hall, N.J., 1993 and J. R. Treichler, I. Fijalkow, C. R. Johnson, Jr., "Fractionally spaced equalizers," IEEE Signal Processing Magazine, vol. 13, no. 3, May 1996 for details). The quantities $\{h_0, h_1\}$ and $\{g_0, g_1\}$ are the so-called polyphase components of the channel and FFEs, and are denoted by N and L size vectors $\{h_0, h_1\}$ and $\{g_0, g_1\}$ (see FIG. 6). The noise sequences $\{v_0(n), v_1(n)\}$ are also the even and odd samples of $v(n)$, with powers $2\sigma_v^2$.

A model for the multichannel representation, just like the one for the symbol spaced case in equation (4) may be rewritten by collecting $\{g_0, g_1\}$ into a single vector g', as:

$$g' = [g_1 \, g_0] \quad \text{Equation (44)}$$

with the output of the multichannel system given by:

$$[y_{0,n} \, y_{1,n}] g' \quad \text{Equation (45)}$$

Thus, the following model of Equation (46) works for the input to g':

$$[y_{0,n} \, y_{1,n}] = x_n[H_0 \, H_1] + [v_{0,n} \, v_{1,n}] \quad \text{Equation (46)}$$

where $\{H_0, H_1\}$ are the convolution matrices associated with the subchannels $\{h_0, h_1\}$. It is more convenient, however, to express the inner product in Equation (45) as a function of the original FFE coefficients vector g, by reordering the entries of g'. In this case, Equation (46) is replaced by:

$$y'_n = x_n H' + v'_n \quad \text{Equation (47)}$$

where $$H' = \begin{bmatrix} h(1) & h(0) & & & & \\ h(3) & h(2) & h(1) & h(0) & & \\ \vdots & \vdots & h(3) & h(2) & & \\ h(2N-1) & h(2N-2) & \vdots & \vdots & \ddots & h(0) \\ & & h(2N-1) & h(2N-2) & & h(2) \\ & & & & \ddots & \vdots \\ & & & & h(2N-1) & h(2N-2) \end{bmatrix} \quad \text{Equation (48)}$$

Given this convolution matrix and the noise variance $\sigma_v^2$, the solution for the fractionally space problem is simply given by Equations (26) and (27), with $\{H_\delta, \overline{H}, \sigma_v^2\}$ replaced by $\{H'_\delta, \overline{H}', \sigma_v^2\}$ (similarly to the symbol-spaced case, here we assume M>N-1).

For the symbol-spaced DFE, the shift structure of $H_\delta$ implies that $k_{L,n} = k_{L+1,n-1}(1:L)$. That is, the normalized gain $k_{L,n}$ can be computed fast, by performing the order update of $k_{L,n-1}$ to $k_{L+1,n-1}$, and then retaining the first L entries of $k_{L+1,n-1}$ as $k_{L,n}$. The procedure to derive a fast recursion in the T/2-spaced case follows the same principle. The only difference here is that the data matrix $H'_\delta$ has now a double shift structure, in the sense that each row is formed by shifting two samples of the channel at a time. Thus, two successive order updates from $k_{L,n-1}$ to $k_{L+2,n-1}$ are performed and then the first L entries of $k_{L+2,n-1}$ are retained:

$$k_{L,n-1} \rightarrow k_{L+1,kn-1} \rightarrow k_{L+2,n-1} \qquad \text{Equation (49)}$$

so that $$k_{L,n} = k_{L+2,n-1}(1:L) \qquad \text{Equation (50)}$$

In other words, the resulting algorithm is given by two consecutive forward prediction problems similar to operations (1) through (6) of Table 2 of orders L and L+1, respectively. Table 3 lists the resulting algorithm for the T/2-spaced case.

TABLE 3

Fast Transversal Computation of FFE coefficients for the T/2-spaced equalizer.

Initialization $\zeta_L^f(-1) = \zeta_{L+1}^f(-1) = 2\sigma_v^2$ $w_{L,-1}^f = w_{L+1,-1}^f = k_{L,0} = k_{L+1,0} = 0$ $\gamma_L(0) = \gamma_{L+1}(0) = 1$ For n = 0 to δ repeated operations (I) to (II):

(I) For q = L to L + 1 repeat operations (1) to (6):

(1) $\alpha_q(n-1) = h(2n+q-L+1) - h_{n-1} w_{q,n-2}^f$ (2) $f_q(n-1) = \gamma_q(n-1)\alpha_q(n-1)$ (3) $k_{q+1,n-1} = \begin{bmatrix} 0 \\ k_{q,n-1} \end{bmatrix} + \frac{\alpha_q^*(n-1)}{\zeta_q^f(n-2)}\begin{bmatrix} 1 \\ -w_{q,n-2}^f \end{bmatrix}$ (4) $\zeta_q^f(n-1) = \zeta_q^f(n-2) + \alpha_q^*(n-1)f_q(n-1)$ (5) $w_{q,n-1}^f = w_{q,n-2}^f + k_{q,n-1}f_q(n-1)$ (6) $\gamma_{q+1}(n) = \gamma_q(n)\frac{\zeta_q^f(n-2)}{\zeta_q^f(n-1)}$ (II) $k_{L,n} = K_{L+1,n-1}(1:L)$
Set $g_{opt} = k_{L,\delta}\gamma_{L+2}(\delta)$ In the general case of a T/S spaced equalizer, the fast DFE tap computation is a straightforward extension of the above algorithm, where q is iterated from L to (L+S-1). However, in the fractionally spaced equalizer, the RLS problem is formulated as a multi-channel problem. In such case, a multi-channel Kalman gain is calculated for the multi-channel RLS problem and the FFE taps are determined there from. Note that in the expressions of Table 3, successive order updates are performed.

Now, the optimal FBE taps could now be computed as $$b_{opt} = \begin{bmatrix} I_M & 0 \end{bmatrix} F * \Lambda_S (F \otimes I_S) \begin{bmatrix} g_{opt} \\ 0 \end{bmatrix} \qquad \text{Equation (51)}$$

where $\Lambda_S$ is a block diagonal matrix, which satisfies $$C_S = F_S^* \Lambda_S F_S \qquad \text{Equation (52)}$$

where $F_S = FI_S$ and $C_S$ is a block circulant matrix, which is formed by extending the matrix H in the same manner as in Equation (39). As was the case with the symbol spaced operations described above, the convolution may be performed in a transformed domain, e.g., Frequency Transformation domain, Discrete Cosine Transformation domain and the Discrete Hadamard Transformation domain, among others. In such case a Croniker product may be employed in conjunction with such domain transformation in performing multi-channel convolution in the selected transformed domain.

Figure 7:
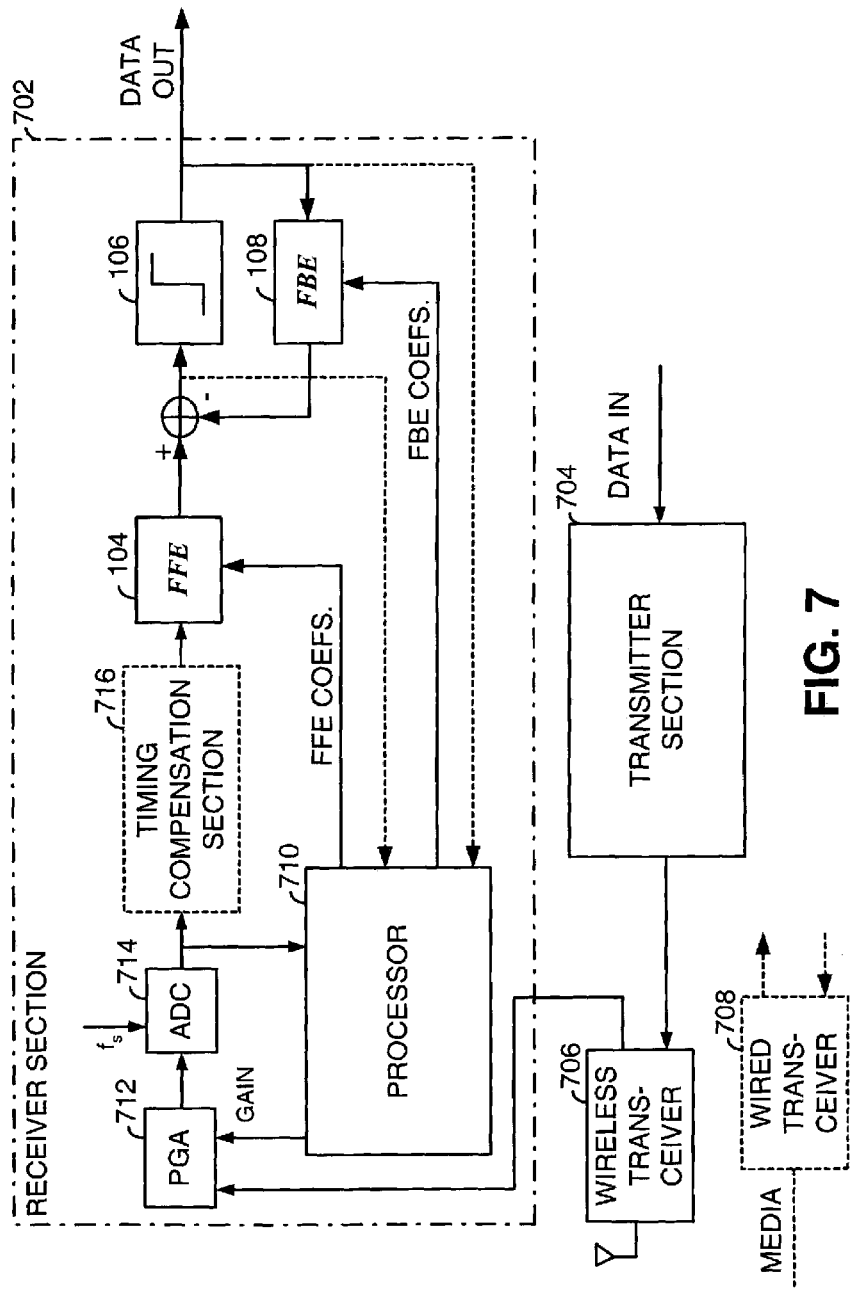
FIG. 7 is a block diagram illustrating a transceiver constructed according to the present invention.

FIG. 7 is a block diagram illustrating a transceiver constructed according to the present invention. The components of the transceiver 700 are resident in a communications device and are illustrated only generally to show how the operations of the present invention would be accomplished in such a transceiver. The transceiver 700 includes a receiver section 702 and a transmitter section 704 and further includes either a wireless transceiver 706 or a wired transceiver, depending upon the system in which the transceiver 700 is implemented. In the case of a cellular device, RF device, satellite system device, or another wireless implementation, the transceiver 700 includes a wireless transceiver. However, in the case of a cable modem, a LAN device, a home networking device, or another device that couples to a physical media, the transceiver 700 includes a wired transceiver 708. Further, if the present invention is implemented in a Serializer/Deserializer (SERDES) or similar application, the receiver section 702 and transmitter section 704 may couple to a media without a wired transceiver 708.

Further discussion of the transmitter section 704 and receiver section 702 are in the context of baseband processing. In such case, the receiver section 702 receives a baseband signal from the wireless transceiver 706 (or wired transceiver 708) that is baseband modulated and operates upon the baseband signal to extract data. These operations include determining DFE coefficients according to the present invention and operating upon the baseband signal using the determined DFE coefficients.

The transmitter section 704 receives digital data to be transmitted from a host, codes the digital data into a baseband signal, and passes the baseband signal to the RF transceiver 706. The RF transceiver 706 couples the baseband signal to an RF carrier to create an RF signal and transmits the RF signal to a receiving device across a wireless link.

The receiver section 702 receives a baseband signal that carries coded data from the RF transceiver 706. A Programmable Gain Amplifier (PGA) 712 adjusts the gain of the baseband signal and then provides the gain-adjusted baseband signal to an Analog-to-Digital Converter (ADC) 714 for sampling. The ADC 208 samples the gain adjusted baseband signal at a particular sampling frequency, $f_s$ (that is the symbol clock frequency), to produce samples thereof.

A processor 710 couples to the output of the ADC 714 and analyzes a preamble sequence contained in each received physical layer frame. Based upon the preamble sequence, the processor 710 determines a gain to be applied to portions of the baseband signal corresponding to the data carrying portions of the frame and provides this gain to the PGA 712. Further, the processor 710 may also interact with the optional timing compensation section 716 to compensate for symbol timing and RF carrier mismatches.

The processor 710, based upon the preamble sequence (and based upon actual extracted data in some operations), also determines FFE 104 and FBE 108 coefficients. The manner in which these coefficients are determined was previously described in detail herein. Further, and as was also previously described, the processor 710 may estimate a channel and calculate DFE coefficients based upon unknown but assumed data content. After the processor 710 determines these coefficients, they are applied to the FFE 104 and FBE 108 for subsequent use in extracting data from the baseband signal.

The structure described in FIG. 7 may be embodied using various types of circuits formed using various manufacturing processes. For example, in one particular embodiment, the RF transceiver 706 (or wired transceiver 708) is embodied in a first integrated circuit that is coupled to a second integrated circuit that includes the transmitter section 704 and the receiver section 702, among other circuits. In another embodiment, the RF transceiver 706, the transmitter section 704 and the receiver section 702 are all formed on a single monolithic integrated circuit. These integrated circuits may be constructed in CMOS or another semiconductor technology, e.g., PMOS, NMOS, Bipolar, etc.

Further, the receiver section 702 of FIG. 7 may be constructed using various circuit elements/combinations. In one embodiment, all structures past the ADC 714 in the receiver section 702 are embodied using a Digital Signal Processor (DSP) or similar processing device. In another embodiment, dedicated signal path circuitry embodies each of the structural components of the receiver section 702, including the processor 710. While a DSP implementation would provide more flexibility, dedicated signal path circuitry would typically provide higher performance at a lower cost and with lower power consumption.

The structure and operation of the present invention may be employed in satellite communication systems, satellite television systems, HDTV systems, fixed wireless communication systems, mobile wireless communication systems, cable modem/television communication systems, home networking systems, wireless local area networking systems, wired local area networking systems, and many other types of communication systems. The present invention applies to all types of communication devices in which equalizers are employed to operate upon received signals.

Figure 8:
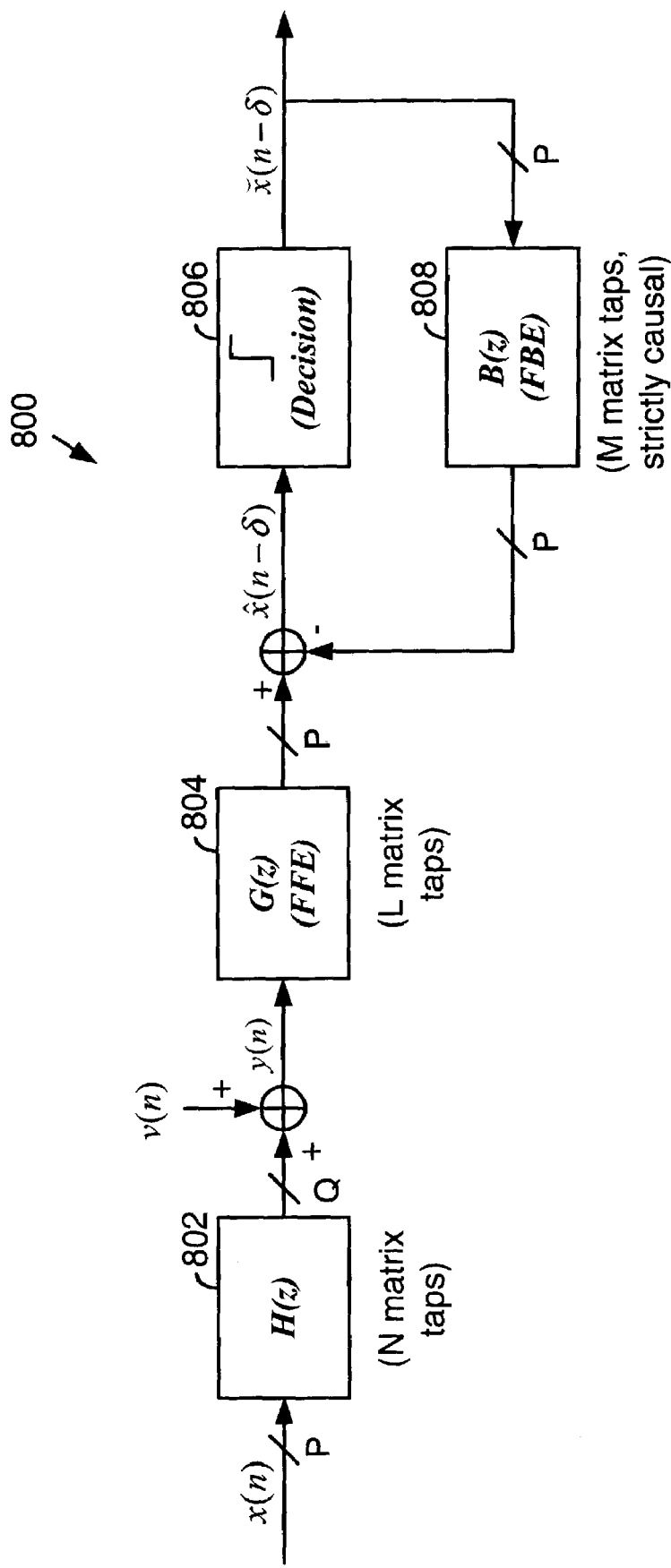
FIG. 8 is a block diagram illustrating a Multi-Input-Multi-Output (MIMO) digital communication system that operates according to the present invention to equalize a channel.

FIG. 8 is a block diagram illustrating a Multi-Input-Multi-Output (MIMO) digital communication system that operates according to the present invention to equalize a channel. MIMO digital communication systems, as the term implies, are communication systems that include multiple inputs on a transmitting side and multiple outputs on a receiving side. In such systems, MIMO decision feedback equalization is used to mitigate inter-symbol interference (ISI) that results from channel multi path propagation.

Figure 9:
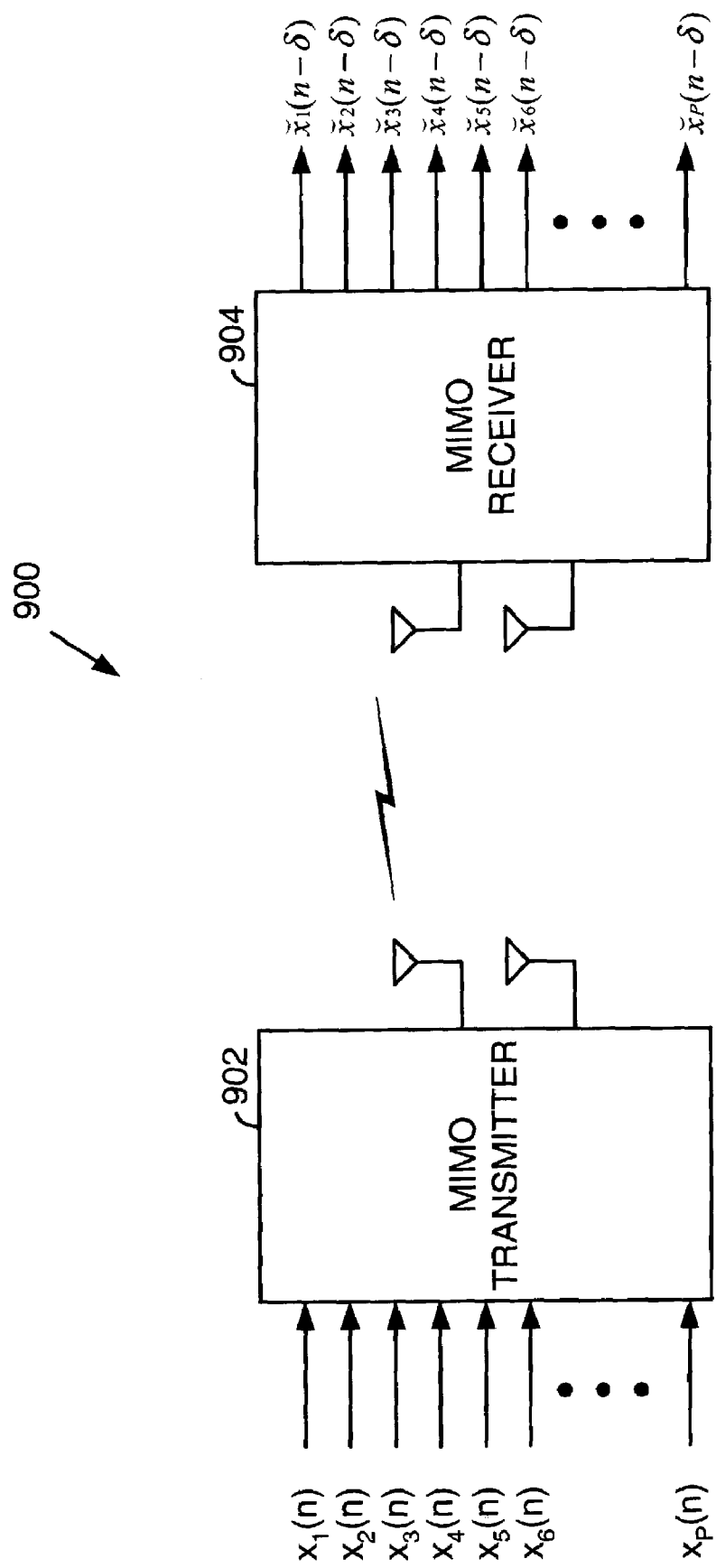
FIG. 9 is a system diagram illustrating a wireless digital communication system in which a MIMO receiver 904 operates according to the present invention.
Figure 10:
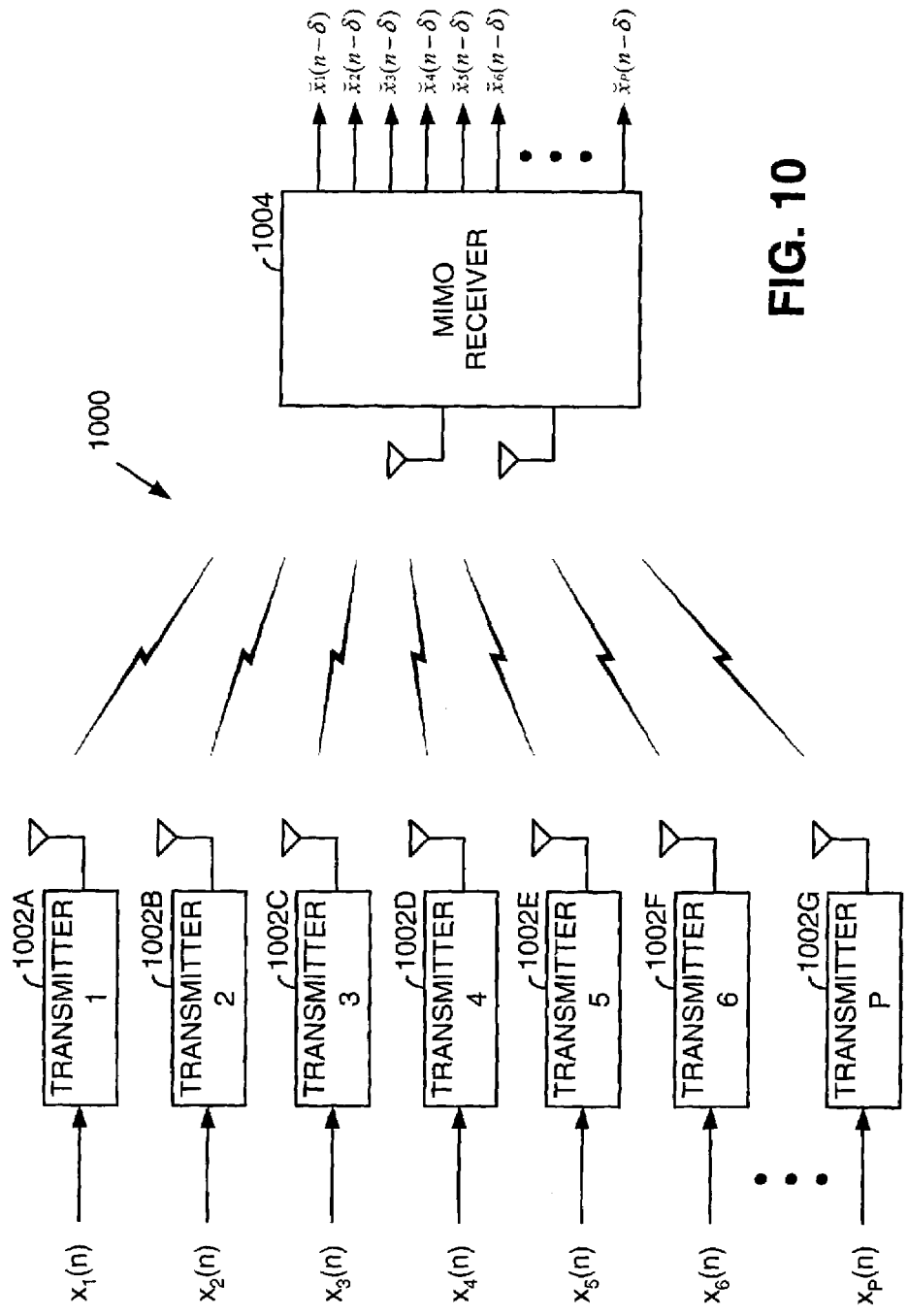
FIG. 10 is a system diagram illustrating a wireless digital communication system that includes a plurality of transmitters and a MIMO receiver that operates according to the present invention.

In the embodiment of FIG. 8, an input symbol stream includes P unique transmitted signals, represented by $x_0(n)$, $x_1(n), \ldots, x_{P-1}(n)$ (as are further shown with reference to FIGS. 8, 9, and 10). The nomenclature of FIG. 8 is used herein to describe the method of the present invention. Thus, the P transmitted signals are referred to in combination as transmitted signal vector x(n). The transmitted signal vector x(n) consists of a known training sequence followed by unknown data. The transmitted signal vector x(n) passes through a channel 802 represented by H(z) that is represented to have N taps. The channel 802 includes additive noise v(n), which is white and Gaussian and has power spectral density $\sigma_v^2$. The output of the channel 804 is referred to as y(n) and has a length Q (the value Q is a function of P and N).

A MIMO DFE that equalizes the channel includes a MIMO FFE 804 having function G(z) and length L and a MIMO FBE 808 having function B(z) and length M (that is assumed to be greater or equal to the channel memory, i.e., $M \geq N-1$). The outputs of both the MIMO FFE 804 and the MIMO FBE 808 have a width P that corresponds to the multiple numbers of signals. MIMO decision block 806 makes soft decisions for the MIMO symbol stream and produces as P output symbol streams $\check{x}_0(n-\delta)$, $\check{x}_1(n-\delta), \ldots, \check{x}_{P-1}(n-\delta)$. These soft decisions are provided to further receiver components, e.g., a Viterbi decoder to produce hard decisions based upon the soft decisions.

Figure 11:
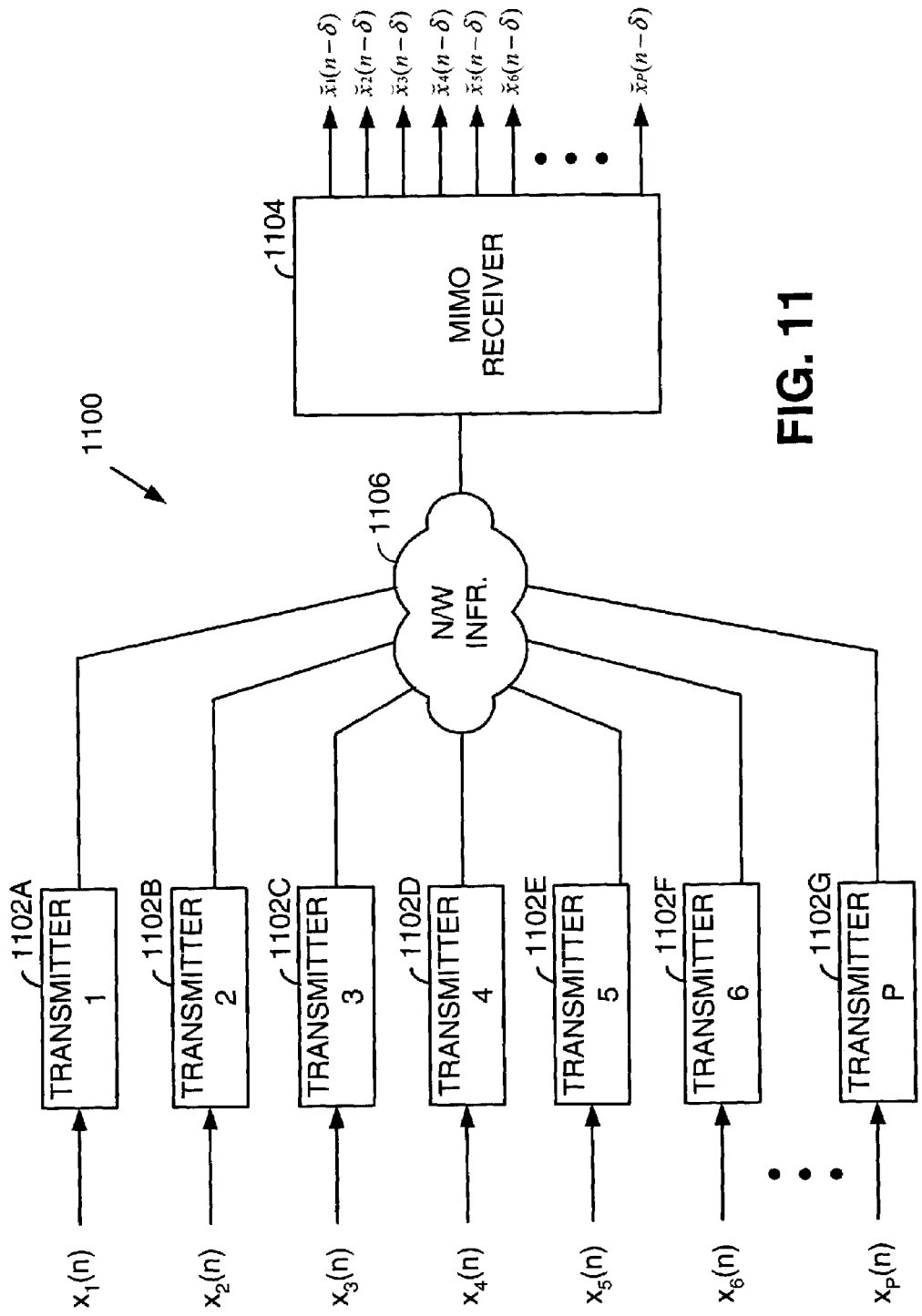
FIG. 11 is a system diagram illustrating a wired digital communication system that includes a plurality of transmitters and a MIMO receiver that operates according to the present invention.

Examples of systems in which the MIMO DFE of the present invention may be implemented include wireless systems, e.g., cellular wireless systems, fixed local loop wireless systems, wireless local area networks, high definition television systems, etc., and wired systems in which multiple transmitters and receives share a common media, e.g., cable modem systems, etc. Diagrams representing such systems are illustrated in FIGS. 9, 10, and 11. The structure of FIG. 7 may be employed to implement the structure and operations described with reference to FIGS. 8-11.

FIG. 9 is a system diagram illustrating a wireless digital communication system 900 in which a MIMO receiver 904 operates according to the present invention. The wireless system 900 includes a MIMO transmitter 902 that operates to receive a plurality of signal streams and to form a wireless signal and that transmits the wireless signal. The MIMO receiver 904 receives the wireless signal after a corresponding channel has operated upon it. The MIMO receiver 904 includes a MIMO DFE that operates according to the present invention to equalize the received signal and to produce output based thereupon. As is illustrated, the MIMO receiver 904 may include antenna diversity structure.

FIG. 10 is a system diagram illustrating a wireless digital communication system 1000 that includes a plurality of transmitters 1002A-1002G and a MIMO receiver 1004 that operates according to the present invention. Each of the plurality of transmitters 1002A-1002G produces a respective transmitted signal that carries a respective input symbol stream, $x_1(n), x_2(n), \ldots, x_P(n)$. The MIMO receiver 1004 receives the plurality of transmitted signals as a composite signal after they have been operated upon the channel, equalizes the plurality of received signals, and produces soft decisions for the equalized symbols. The wireless digital communication system 1000 of FIG. 10 may be embodied as a cellular wireless network, a fixed wireless access network, a wireless local area network, or in another type of wireless communication system in which a MIMO receiver 1004 receives wireless transmissions from a plurality of wireless transmitters 1002A-1002G. As is illustrated, the MIMO receiver 904 may include antenna diversity structure.

FIG. 11 is a system diagram illustrating a wired digital communication system 1100 that includes a plurality of transmitters 1102A-1102G and a MIMO receiver 1104 that operates according to the present invention. Each of the plurality of transmitters 1102A-1102G produces a respective transmitted signal that carries a respective input symbol stream, $x_0(n), x_1(n), \ldots, x_{P-1}(n)$ and couples its respective signal to a network infrastructure 1106. The MIMO receiver 1104 couples to the network infrastructure 1106 and receives the plurality of transmitted signals as a composite signal after they have been operated upon the channel, equalizes the plurality of received signals, and produces soft decisions for the equalized symbols. The wired digital communication system 1000 of FIG. 11 may be embodied in a cable modem system, or in another type of system in which the MIMO receiver 1004 receives wired transmissions from a plurality of transmitters 1002A-1002G

Referring again to FIG. 8, an efficient equalization technique for equalizing a channel in a MIMO system includes first estimating the channel impulse responses between each transmitter and each receiver using the training sequence, and then using this estimate to compute the optimal DFE tap coefficients corresponding to the estimated channel. The computed tap coefficients are then uploaded to the equalizer taps of the MIMO FFE (including MIMO FFE 804 and MIMO FBE 808) of FIG. 8. This procedure should be repeated as often as possible, especially in cases of fast varying channels. Moreover, the received data stream is usually buffered during the period assigned for the channel estimation and the equalizer tap computation.

In this context, a critical factor for the success of this equalization structure is the complexity of the MIMO DFE tap computation. A fast computation technique has the following benefits:

1. It reduces the memory size required to buffer the received sequence during the period required for tap computations.
2. It allows more frequent uploading of new equalizer coefficients, thus enabling the equalizer to track fast channel variations.
3. It simplifies the needed hardware, especially if such computations are performed through structured recursive equations.

According to the present invention, an efficient method for computing the optimal MIMO MMSE-DFE coefficients includes characterizing a solution to the problem of solving for MIMO FBE and FFE coefficients as a fast recursive-least-squares (RLS) adaptive algorithm. This fast algorithm has the following advantages over the current most efficient algorithm: (1) the proposed algorithm has less overall computational complexity than prior techniques in solving for DFEs having the same channel and DFE filters length; and (2) the technique relies on the use of a set of structured recursions, which makes it attractive in data-path implementations which do not rely on the use of a DSP core.

For simplicity of presentation a symbol-spaced MIMO DFE is considered. Extension of the teachings provided herein to the fractionally-spaced case is straightforward. Further, the following commonly used assumptions are made herein:

1. The input sequences to the i-th channel, $\{x_i(n)\}$, are complex, independent and identically distributed with power $\sigma_{x,i}^2$. The autocorrelation matrix of the corresponding vector process $x(n)$ is given by:

$$R_x = I \mathrm{diag}(\sigma_{x,0}^2, \sigma_{x,1}^2, \ldots, \sigma_{x,P-1}^2) \qquad \text{Equation (53)}$$

where denotes the Kronecker product, and I is identity matrix of appropriate dimensions.

The noise sequences $\{v_q(n)\}$ are assumed to be white Gaussian with power $\sigma_{v,i}^2$. The autocorrelation matrix of size LQ of the corresponding vector noise process $v(n)$ is given by:

$$R_v = I_L \mathrm{diag}(\sigma_{v,0}^2, \sigma_{v,1}^2, \ldots, \sigma_{v,Q-1}^2) \qquad \text{Equation (54)}$$

The decisions (from decision block 806) $\hat{x}(n-\delta)$ are assumed to be correct, and hence equal to $x(n-\delta)$. Moreover, the assumption that only previous decisions of other users are available at the present time, i.e., time $(n-\delta)$. It is further assumed that the use of current decisions of other users contributes with negligible improvement of the final output SNR.

The MIMO FFE 804 has a matrix filter $G(z)$ with length L. The number of matrix taps M of the MIMO FBE 808 having matrix filter $B(z)$ is such that $M \geq N-1$.

The goal in determining the taps of the MIMO FFE 804 and the MIMO FBE 808 is to minimize the mean squared error quantity:

$$\zeta = E\|x(n-\delta) - \hat{x}(n-\delta)\|^2, \qquad \text{Equation (55)}$$

where $\hat{x}(n-\delta)$ is the delayed input signal estimate prior to the decision. By collecting the tap matrix coefficients both $G(z)$ and $B(z)$ into vectors, the received signal $\hat{x}(n-\delta)$ is expressed as:

$$\hat{x}(n-\delta) = y_n g - \check{x}_n b, \qquad \text{Equation (56)}$$

where:

$$y_n = x_n H + v_n, \qquad \text{Equation (57)}$$

H is the $(N+L-1)P \times LQ$ convolution matrix associated with the channel matrix coefficients $h(0), h(1), \ldots, h(N-1)$, and is given by:

$$H = \begin{bmatrix} h(0) & 0 & \cdots & 0 \\ h(1) & h(0) & \cdots & 0 \\ \vdots & \vdots & \ddots & \vdots \\ h(N-1) & h(N-2) & \ddots & h(0) \\ 0 & h(N-1) & \ddots & h(1) \\ \vdots & \vdots & \ddots & \vdots \\ 0 & 0 & \cdots & h(N-1) \end{bmatrix} \qquad \text{Equation (58)}$$

The row vector $x_n$ is the $1 \times (N+L-1)P$ input regressor:

$$x_n \triangleq [x(n) x(n-1) \ldots x(n-N-L+2)] \qquad \text{Equation (59)}$$

With $x(n) \triangleq [x_0(n) x_1(n) \ldots x_{P-1}(n)]$. The row vector $y_n$ is the $1 \times LQ$ input regressor to the feed forward filter g, i.e., $$y_n \triangleq [y(n) y(n-1) \ldots y(n-L+1)] \qquad \text{Equation (60)}$$

$$g \triangleq \mathrm{col}[g_0, g_1, \ldots, g_{L-1}] \qquad \text{Equation (61)}$$

Where $y(n) \triangleq \lfloor y_0(n) y_1(n) \ldots Y_{Q-1}(n) \rfloor$ and $\{g_i\}$ has size $Q \times P$. Similarly, $\check{x}_n$ is the $1 \times MP$ input regressor to the (strictly causal) feedback filter b, i.e., $$\check{x}_n \triangleq [x(n-\delta-1) \ldots x(n-\delta-M)] \qquad \text{Equation (62)}$$

$$b \triangleq \mathrm{col}[b_0, b_1, \ldots, b_{M-1}] \qquad \text{Equation (63)}$$

Where $\{b_i\}$ are $P \times P$. Also, $v_n$ is the $1 \times LQ$ noise vector process.

By collecting g and b into a single matrix w, the minimization of Equation (55) can be written as:

$$\min_w E \left\| x(n-\delta) - [\underbrace{y_n - \check{x}_n}_{u}] \underbrace{\begin{bmatrix} g \\ b \end{bmatrix}}_{w} \right\|^2 \qquad \text{Equation (64)}$$

Now, denoting $R_u$ as the variance of the augmented input regression vector u, and $R_{ux(n-\delta)}$ as the cross variance of the augmented input regression vector u, a solution to this smoothing problem may be determined using a known technique, see, e.g., T. Kailath, A. H. Sayed, and B. Hassibi, *Linear Estimation*, Prentice Hall, N.J., 2000, to produce an optimal solution for w according to:

$$w_{opt} = R_u^{-1} R_{ux(n-\delta)}, \qquad \text{Equation (65)}$$

where:

$$R_u \triangleq E \begin{bmatrix} y_n^* \\ -\check{x}_n^* \end{bmatrix} [y_n - \check{x}_n] \begin{bmatrix} R_y & -R_{y\check{x}} \\ -R_{\check{x}y} & R_{\check{x}} \end{bmatrix} \qquad \text{Equation (66)}$$

and $$R_{ux(n-\delta)} = E \begin{bmatrix} y_n^* x(n-\delta) \\ -\check{x}_n^* x(n-\delta) \end{bmatrix} = \begin{bmatrix} R_{yx(n-\delta)} \\ -R_{\check{x}x(n-\delta)} \end{bmatrix}. \qquad \text{Equation (67)}$$

Using a channel output model, such as the channel output model described in T. Kailath, A. H. Sayed, and B. Hassibi, *Linear Estimation*, Prentice Hall, N.J., 2000, and the fact that $\{x_i(n)\}$ are individually identically distributed (i.i.d.), The following closed form expressions for $\{R_y, R_{y\check{x}}, R_{\check{x}}, R_{yx(n-\delta)}, R_{\check{x}x(n-\delta)}\}$ may be formed:

$$R_y = E y_n^* y_n = R_v + H^* R_x H, \qquad \text{Equation (68)}$$

$$R_{y\check{x}} = H^*(E x_n^* x_n) = H^* \begin{bmatrix} 0_{(\delta+1)P \times MP} \\ R_x^{(MP)} \\ 0_{(N+L-M-\delta)P \times MP} \end{bmatrix} \triangleq \overline{H}^* \overline{R}_x \qquad \text{Equation (69)}$$

$$R_{\check{x}} = R_x \qquad \text{Equation (70)}$$

$$R_{yx(n-\delta)} = H^* E x_n^* x(n-\delta) = H^* \begin{bmatrix} 0_{(\delta+1)P \times P} \\ R_x^{(P)} \\ 0 \end{bmatrix} \triangleq h^* R_x^{(P)} \qquad \text{Equation (71)}$$

$$R_{\check{x}x(n-\delta)} = 0 \qquad \text{Equation (72)}$$

where $\overline{H}$ is a submatrix of H, such that $$H = \begin{bmatrix} H_1 \\ \overline{H} \\ H_2 \end{bmatrix}, \text{ where } H_1 \text{ is } (\delta+1) P \times LQ \qquad \text{Equation (73)}$$

Now, with the quantities defined above, Equation (65) becomes:

$$w_{opt} = \begin{bmatrix} R_v + H^* R_x H & -\overline{H}^* \overline{R}_x \\ -\overline{R}_x \overline{H} & \overline{R}_x \end{bmatrix}^{-1} \begin{bmatrix} h^* R_x^{(P)} \\ 0 \end{bmatrix} \qquad \text{Equation (74)}$$

Using the well-known inverse of block matrices, Equation (74) may be rewritten as:

$$w_{opt} = \begin{bmatrix} I \\ \overline{H} \end{bmatrix} (R_v + H_1^* R_x^{(1)} H_1 + H_2^* R_x^{(2)} H_2)^{-1} h^* R_x^{(P)}. \qquad \text{Equation (75)}$$

Further, because $M \geq N-1$, the quantities $h_\delta$, $H_1$ and $H_2$ are such that:

$$\begin{bmatrix} H_1 \\ H_2 \end{bmatrix} = \begin{bmatrix} H_\delta & 0 \\ 0 & \overline{H} \end{bmatrix} \text{ and } h = [h_\delta \quad 0]. \qquad \text{Equation (76)}$$

This implies the following expressions for the optimal feedback and feed forward coefficients may be rewritten as:

$$g_{opt} = (R_v + H^* \delta R_x^{(\delta)} H_\delta)^{-1} h^*_\delta R_x^{(P)} \qquad \text{Equation (77)}$$

$$b_{opt} = \overline{H} g_{opt} \qquad \text{Equation (78)}$$

where $R_x^{(\delta)}$ and $R_x^{(P)}$ are size $\delta$ and P matrices. The above expressions are valid for all values of the delay $\delta$. In general, the optimal value for the decision delay $\delta$ is within the range $L-1 \leq \delta_{opt} \leq N+L-2$.

In finding a solution for $g_{opt}$, a coefficient matrix is first determined as:

$$P_\delta \triangleq (R_v + \underline{H}^*_\delta \underline{H}_\delta)^{-1}, \qquad \text{Equation (79)}$$

Where the definition $\underline{H}_\delta \triangleq R_x^{1/2} H_\delta$ is made. The optimal solution for the feed forward coefficients is then given by:

$$g_{opt} = P_\delta \underline{h}^*_\delta R_x^{1/2}. \qquad \text{Equation (80)}$$

A reader acquainted with the theory of recursive least squares algorithms might readily recognize that the quantity $\overline{g}_{opt} = P_\delta h^*_\delta$ corresponds exactly the definition of the Kalman gain matrix in the recursive least squares algorithm. The Kalman gain matrix is used to update the optimal weights in a regularized (multi channel) RLS problem. More specifically, given a $(n+1)P \times LQ$ data matrix $H_n$ and the corresponding coefficient matrix $P_n$, the Kalman gain $\overline{g}_n = P_n \underline{h}^*_n$ can be time-updated according to the following recursions (see e.g. T. Kailath, A. H. Sayed, and B. Hassibi, *Linear Estimation*, Prentice Hall, N.J., 2000):

$$\gamma^{-1}(n) = I_P + \underline{h}_n P_{n-1} \underline{h}^*_n, \qquad \text{Equation (81)}$$

$$\overline{g}_n = P_{n-1} \underline{h}^*_n \gamma(n), \qquad \text{Equation (82)}$$

$$P_n = P_{n-1} - \overline{g}_n \gamma^{-1}(n) \overline{g}^*_n, \qquad \text{Equation (83)}$$

where $P_{-1} = R_v^{-1}$ and $\overline{g}_0 = 0$.

The computation of $\overline{g}_n$ can be done efficiently, via a fast RLS recursion. That is, consider Equation (82), which can be written as:

$$\overline{g}_n = k_n \gamma(n), \qquad \text{Equation (84)}$$

where $\gamma(n)$ is defined in Equation (81). The quantity $k_n = P_{n-1} \underline{h}^*_n$ is referred to as the normalized Kalman gain matrix in adaptive RLS filtering. The key to achieving fast recursions is to propagate $k_n$ efficiently, by successive order updates and order down dates of $k_n$, using forward and backward LS prediction problems. The well-known fast transversal filter (FTF) is an example where such fast technique is encountered, see e.g., J. Cioffi and T. Kailath, "Fast recursive-leastsquares transversal filters for adaptive filtering," IEEE Trans. on Acoust., Speech Signal Processing, vol. ASSP-32, pp. 304-337, April 1984.

The difference here, however, is that the entries of the regressor $\underline{h}_n$ are the channel matrix coefficients $\underline{h}(0), \ldots, \underline{h}(N-1)$, each of size P×Q (In the multi channel RLS equations, the entries of the regressor are usually given by a row or a column vector, and the recursions have no matrix inversions).

Now let $k_{0,n} = k_n$, and denote $\{k_{i,n}\}$ the augmented Kalman gains that correspond to estimating each column of $\underline{h}(n)$, say, $[\underline{h}(n)]_{:,i}$ from $[\underline{h}(n)]_{:,i+1:Q} \underline{h}_{n-1}$. In order to update $k_{0,n}$ efficiently without matrix inversions, we perform Q successive order updates from $k_{0,n-1}$ to $k_{Q,n-1}$. Now, note that in general the fast recursions that computer $k_{0,n}$ rely on forward and backward prediction problems. Here, because M≥N-1 the matrix $H_\delta$ has a block lower triangular structure, the desired signal for the backward prediction problem is always equal to zero. As a result, the least-squares backward prediction solution up to time δ will be equal to zero, and the fast algorithm will need only the forward prediction part. That is, $$k_{o,n-1} \to k_{l,n-1} \to \ldots k_{Q,n-1} \quad \text{Equation (85)}$$

so that $$k_{0,n} = k_{Q,n-1}(1:QL,:) \quad \text{Equation (86)}$$

The resulting algorithm is then given by consecutive updates of Q forward prediction problems where we estimate the columns of $\underline{h}(n)$ from $\underline{h}_{n-1}$ and compute the corresponding forward prediction matrix-valued quantities. Table 4 lists the resulting multi channel algorithm.

TABLE 4

Fast Computation of $g_{opt}$ for the MIMO DFE.

Initialization

For q = 0 to Q − 1 perform the following initialization steps:

$\zeta_q^f(-2) = \sigma_{v,q}^2$ $w_{q,-1}^f = 0_{QL+q \times Q}$ $k_{0,0} = 0_{QL \times P}$ $\gamma_0(0) = I_P$ For n = 0 to δ: repeat operations (I), (II), and (III):

(I) For q = 1 to Q, repeat (1) to (6):

(1) $\alpha_q(n-1) = [\underline{h}(n)]_{:,Q-q} - \underline{h}_{n-1} w_{q,n-2}^f$ (2) $f_q(n-1) = \gamma_q(N-1) \alpha_q(n-1)$ (3) $k_{q,n-1} = \begin{bmatrix} 0_{1 \times P} \\ k_{q-1,n-1} \end{bmatrix} + \begin{bmatrix} 1 \\ -w_{q,n-2}^f \end{bmatrix} \dfrac{\alpha_q^*(n-1)}{\zeta_q^f(n-2)}$ (4) $\zeta_q^f(n-1) = \zeta_q^f(n-2) + \alpha_q^*(n-1) f_q(n-1)$ (5) $w_{q,n-1}^f = w_{q,n-2}^f + k_{q-1,n-1} f_q(n-1)$ (6) $\gamma_q(n-1) = \gamma_{q-1}(n-1) + \dfrac{f_q(n-1) f_q^*(n-1)}{\zeta_q^f(n-1)}$ (II) $k_{0,n} = k_{Q,n-1}(1:QL, :)$
(III) $\gamma_0(n) = \gamma_Q(n-1)$
Finally, set $g_{opt} = k_{0,\delta} \gamma_0(\delta) R_x^{1/2}$ The exponentially weighted FTF algorithm can become unstable in some finite precision implementations. Hence, the reader may wonder whether this is also the case for the present simplified algorithm, since both have the same essence. There are two advantages, however, that prevent the simplified algorithm from becoming unstable:

(i) The main source of error propagation in the full FTF algorithm arises in the backward prediction section of its recursions. Here, by ruling out the equations associated with the backward prediction problem many of the recursive loops that contribute to the unstable behavior of the full FTF algorithm are automatically eliminated.

(ii) Another source of instability of the FTF recursions is related to the forgetting factor λ that appears in the exponentially weighted RLS problem. Theoretically with λ<1, the redundant components generated by numerical errors would decay to zero as N→∞. However, an averaging analysis shows that this will lead to unstable modes at 1/λ that will cause instability in finite precision. Now, note that the present fast recursions deal with the problem of filtering a finite set of data samples of the channel model. In other words, for the purposes of the present invention, the algorithm must stop when n=δ. Moreover, in the present application, the corresponding forgetting factor is always equal to one, in which case the recursions will present much better numerical behavior. This means that even if the simplified fast algorithm were to become unstable, it would not be likely to happen within the first δ iterations. Furthermore, if this were still the case, a simple increase of the word length would overcome the problem.

The computation of $b_{opt}$ in equation (36) can be performed efficiently via using fast Fourier transform techniques. This can be done by extending the block Toeplitz structure of $\overline{H}$ to form a KP×KQ block-circulant matrix $C_{P,Q}$, where each block entry has size P×Q (see, e.g., M. Vollmer, J. Gotze, M Haardt, "Efficient Joint Detection Techniques for TD-CDMA in the Frequency Domain," COST 262 Workshop "Multiuser Detection in Spread Spectrum Communications", Ulm, Germany, 2001).

In the present case, there is a block diagonal matrix $\Lambda_{P,Q}$ such that $C_{P,Q} = F_P^* \Lambda_{P,Q} F_Q$ where $F_i$ are block-Fourier transforms given by $F_i = FI_i$, with denoting the Kronecker product and the matrix F the K×K DFT matrix. The diagonal elements of $\Lambda_{P,Q}$ can thus be computed from the block-DFT of the first block-column of $C_{P,Q}$. The $b_{opt}$ then becomes $$b_{opt} = R_x [I_{MP} \ 0](F \otimes I_P)^* \Lambda_{P,Q}(F \otimes I_Q) \begin{bmatrix} g_{opt} \\ 0 \end{bmatrix}. \quad \text{Equation (87)}$$

Hence, the complexity is given b P inverse FFTs, Q FFTs, and P FFTs of size K, and KPQ complex multiplies. Thus the overall complexity for computing the feedback filter is $KPQ+(2P+Q)K \log_2(K)$.

Figure 12:
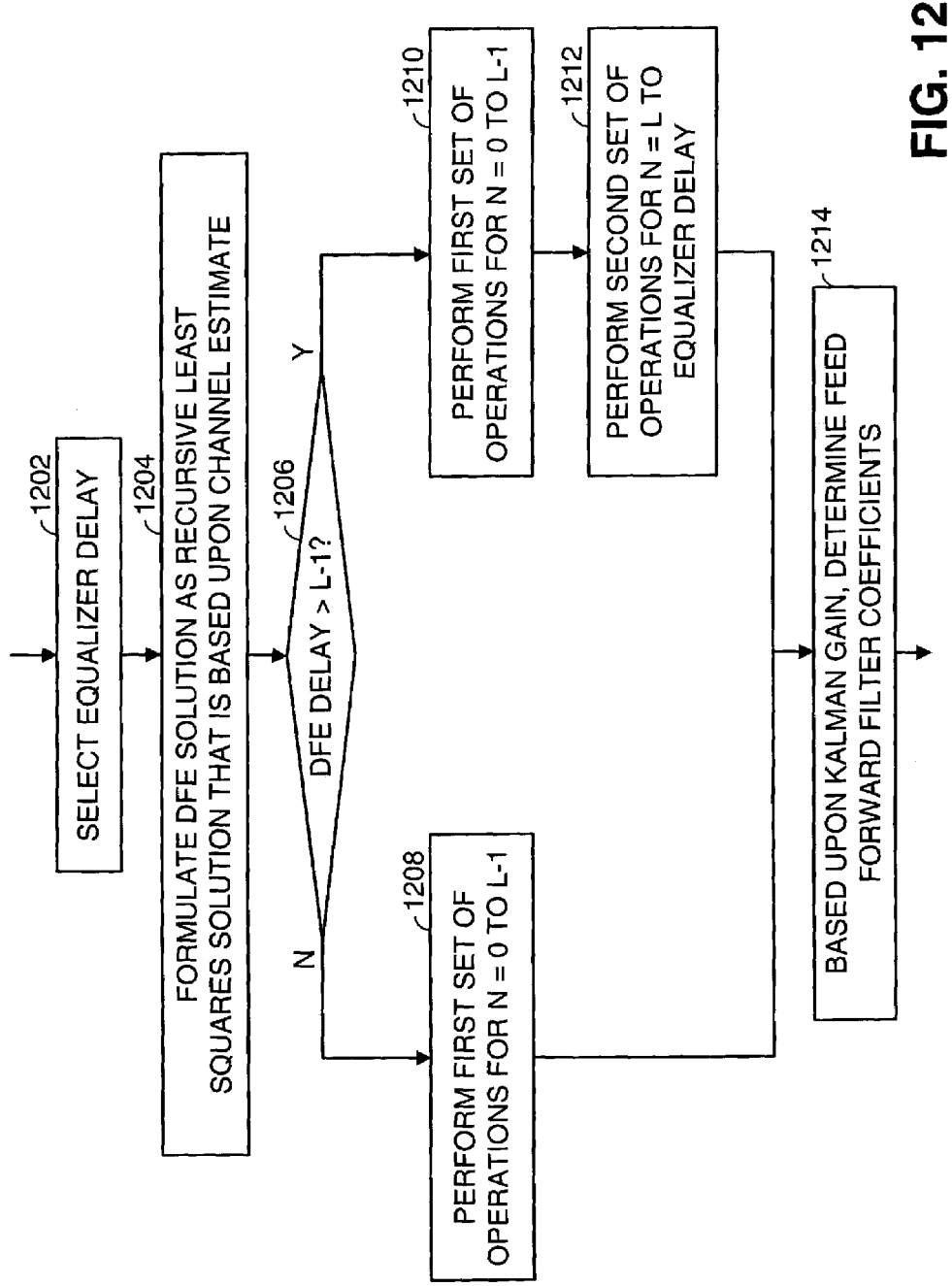
FIG. 12 is logic diagram illustrating operation according to another embodiment of the present invention in determining DFE coefficients.
Figure 14:
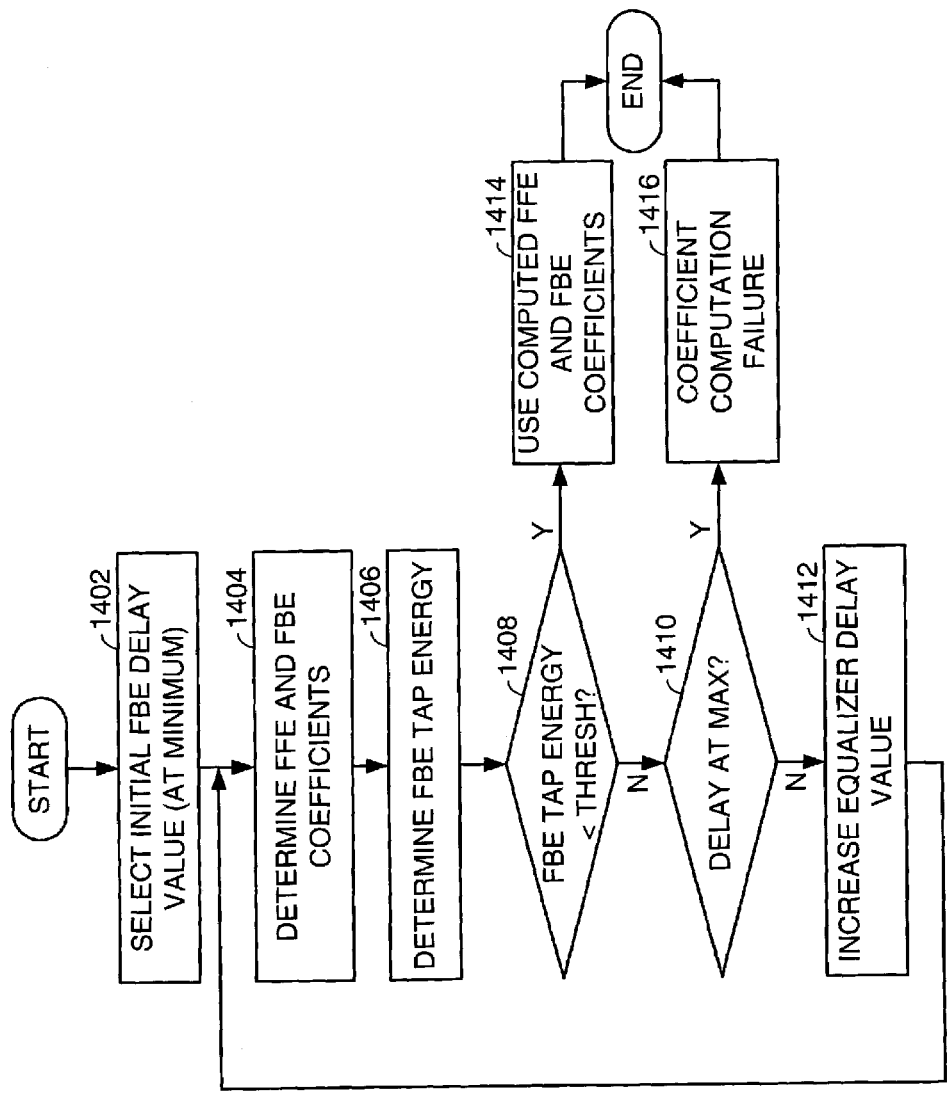
FIG. 14 is a logic diagram illustrating operation according to a first embodiment of the present invention in selecting FBE coefficients.
Figure 15:
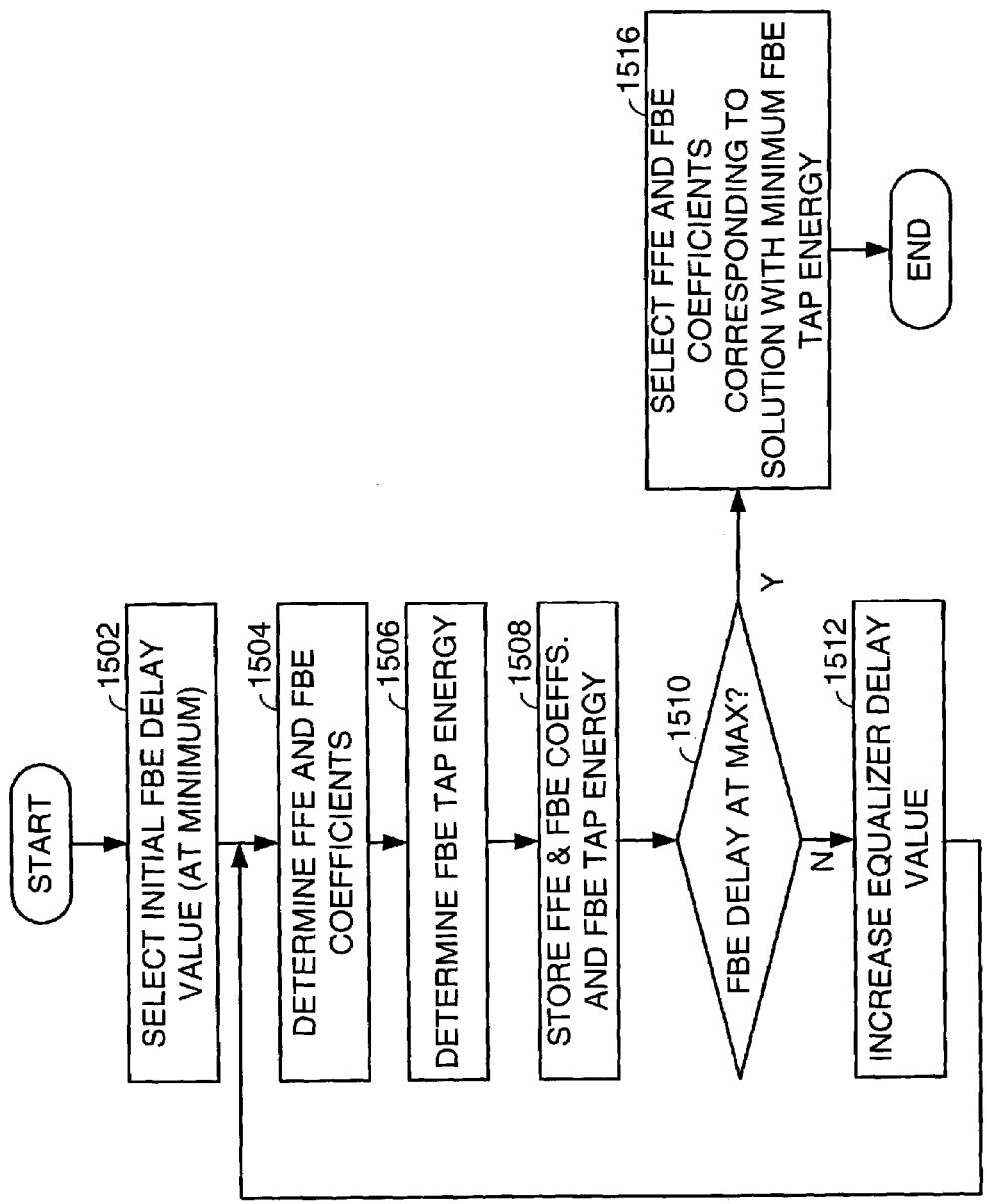
FIG. 15 is a logic diagram illustrating operation according to a second embodiment of the present invention in selecting FBE coefficients.

FIG. 12 is logic diagram illustrating operation according to another embodiment of the present invention for determining FFE coefficients. The operations of FIG. 12 differ from the operations of FIG. 3 in that the delay of FBE is not limited to being less than or equal to the length of the FFE but is chosen to correspond to the channel being equalized (step 1202). FIGS. 14 and 15 describe differing techniques for selecting the DFE delay. Referring still to FIG. 12, operation continues by formulating a solution that, when solved, will yield the DFE coefficients, wherein the solution is formulated as a least squares problem that is based upon the channel response (step 1204).

Next, the operation considers whether the DFE delay is greater than the length of the FFE minus one, i.e., is the DFE delay greater than the FFE delay (step 1206). When the delay of the DFE is less than or equal to a number of taps of the FFE minus one, the method includes solving the least squares problem to yield FFE coefficients of the DFE coefficients by performing a first set of operations (step 1208). However, when the delay of the DFE is greater than the delay of the FFE, operation includes solving the least squares problem to yield FFE coefficients of the DFE coefficients by performing a first set of operations (step 1210) and by performing a second set of operations (step 1212). Finally, the method includes (from step 1208 and from step 1212) convolving the FFE coefficients with a convolution matrix that is based upon the channel response to yield FBE coefficients of the DFE coefficients (step 1214).

The operations of FIG. 12 are further described in the following and illustrated in Table 5. The solutions provided by Tables 2, 3 and 4 were valid only for $\delta \leq L-1$, which is inadequate for channels with long pre-echoes. The general solution for the FFE taps was indicated in Table 1. However, for the values of $n \leq L-1$, the variables corresponding to the backward prediction problem are all equal to zero, while the forward prediction variables are not. For the values of $n > L-1$, the backward prediction variables are non-zero as well. To exploit this property to reduce complexity of the full FTF algorithm in Table 1, updating the backward prediction variables for $n > L-1$ is done, as follows:

TABLE 5

FTF computation of FFE taps for long equalizer delays.

Initialization $\zeta^f(-1) = \zeta^b(0) = \sigma_v^2$ $w^f_{-1} = w^b_{-1} = k_{L,0} = 0$ $\gamma_M(0) = 1$ For $n = 0$ to $L - 1$ repeat operations (1) to (7):

(1) $\alpha_L(n-1) = h(n) - h_{n-1} w^f_{n-2}$ (2) $f(n-1) = \gamma_L(n-1)\alpha(n-1)$ (3) $\bar{k}_{L+1,n} = \begin{bmatrix} 0 \\ k_{L,n-1} \end{bmatrix} + \frac{\alpha*(n-1)}{\zeta^f(n-2)} \begin{bmatrix} 1 \\ -w^f_{n-2} \end{bmatrix}$ (4) $\zeta^f(n-1) = \zeta^f(n-2) + \alpha*(n-1)f(n-1)$ (5) $w^f_{n-1} = w^f_{n-2} + k_{L,n-1} f(n-1)$ (6) $\gamma_L(n) = \frac{\sigma_v^2}{\zeta^f(n-1)}$ (7) $k_{L,n} = \bar{k}_{1:L,n-1}$ For $n = L$ to $\delta$ repeat operations (1) to (13):

(1) $\alpha_L(n-1) = h(n) - h_{n-1} w^f_{n-2}$ (2) $f(n-1) = \gamma_L(n-1)\alpha(n-1)$ TABLE 5-continued FTF computation of FFE taps for long equalizer delays.

(3) $\bar{k}_{L+1,n} = \begin{bmatrix} 0 \\ k_{L,n-1} \end{bmatrix} + \frac{\alpha*(n-1)}{\zeta^f(n-2)} \begin{bmatrix} 1 \\ -w^f_{n-2} \end{bmatrix}$ (4) $\zeta^f(n-1) = \zeta^f(n-2) + \alpha*(n-1)f(n-1)$ (5) $w^f_{n-1} = w^f_{n-2} + k_{L,n-1} f(n-1)$ (6) $\gamma_{L+1}(n) = \gamma_L(n-1)\frac{\zeta^f(n-2)}{\zeta^f(n-1)}$ (7) $v(n) = $ (last entry of $\bar{k}_{L+1,n}$)

(8) $k_{L,n} = \bar{k}_{1:L,n} + v(n) w^b_{n-1}$ (9) $\beta(n) = \zeta^b(n-1)v^*(n)$

(10) $\gamma_L(n) = \frac{\bar{\gamma}_{L+1}(n)}{1 - \bar{\gamma}_{L+1}(n)\beta_L(n)v_L(n)}$

(11) $b(n) = \gamma_L(n)\beta_L(n)$

(12) $\zeta^b(n) = \zeta^b(n-1) + \beta*(n)b(n)$

(13) $w^b_n = w^b_{n-1} + k_{L,n} b(n)$

If $n = \delta$ set $g_{opt} = k_\delta \gamma_L(\delta)$

By so doing, in the first L iterations, we need $3L/2$ multiplies/iteration. For the last $(\delta-L)$ iterations, the complexity is $5L/2$ multiplies/iteration. Thus the total complexity is $[3L^2+5L(\delta-L)]/2$ multiplies. If the full FTF algorithm was used, we would need $5L\delta/2$, which is significantly more complex.

Figure 13:
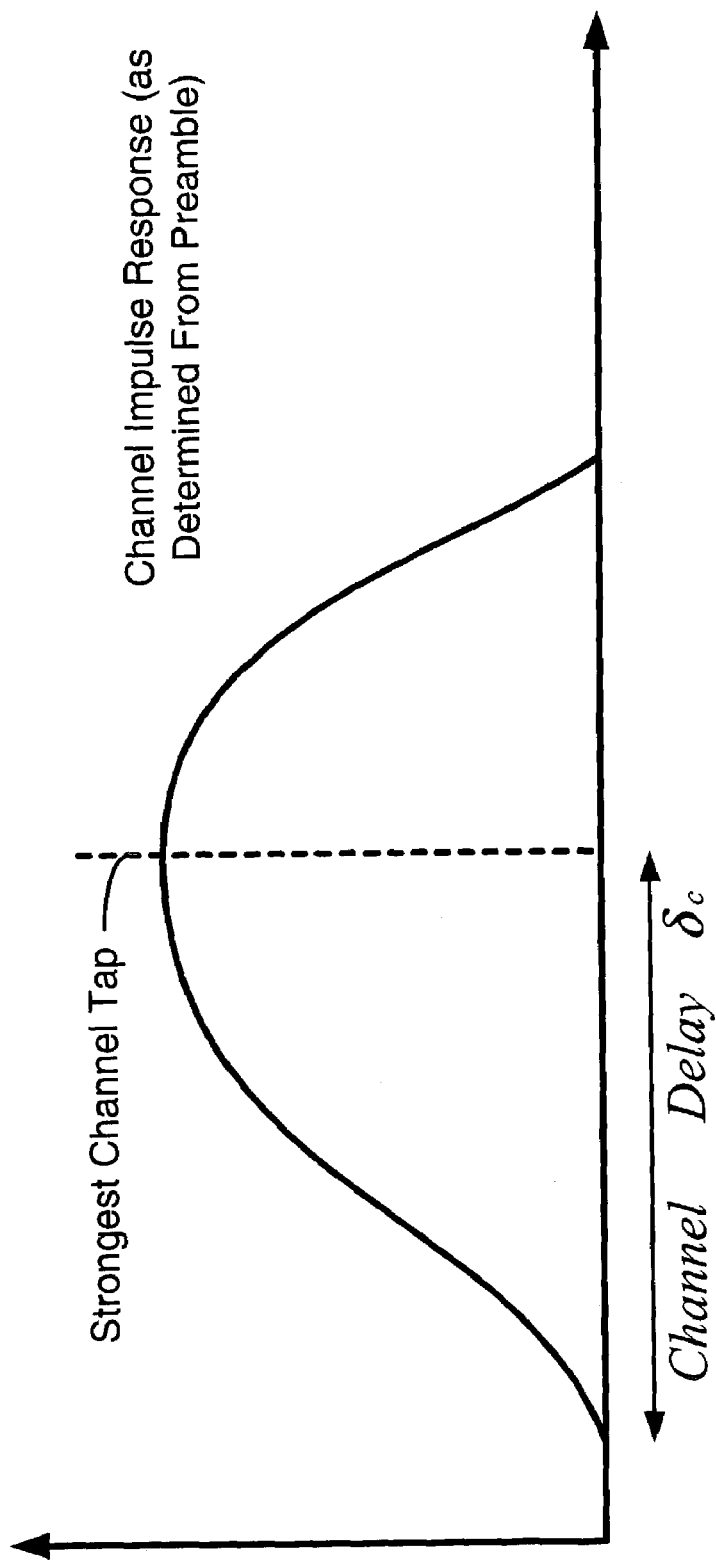
FIG. 13 is a graph illustrating a hypothetical channel impulse response indicating how channel delay may be determined according to the present invention.

FIG. 13 is a graph illustrating a hypothetical channel impulse response indicating how channel delay may be determined according to the present invention. To determine the value of the delay $\delta$ of the FBE, the following procedure could be used. The channel delay $\delta_c$ could be computed as the index of the strongest channel tap. The equalizer delay could then be computed as $\delta = \delta_c + L - 1$.

FIG. 14 is a logic diagram illustrating operation according to a first embodiment of the present invention in selecting FBE coefficients. This operation includes first selecting an initial equalizer delay value (step 1402). Then, for the particular equalizer delay value (FBE delay), the operation includes calculating a set of FFE coefficients and FBE coefficients (step 1404). Then operation then includes determining the FBE tap energy for the particular FBE delay (step 1406). If this FBE tap energy is less than a FBE tap energy threshold (as determined at step 1408) the FFE and FBE coefficients determined for the particular FBE are employed (step 1414). If the FBE tap energy is not less than the FBE tap energy threshold (as determined at step 1408), it is next determined whether the FBE delay is at a maximum (step 1410). If so, no acceptable FBE coefficients have been determined for the particular channel response and FBE configuration, the operation has failed (step 1416). However, if the FBE delay is not at a maximum (as determined at step 1410), the equalizer delay is increased by a step size (or otherwise altered as may be appropriate for the given operations) at step 1412 and operation returns to step 1404.

FIG. 15 is a logic diagram illustrating operation according to a second embodiment of the present invention in selecting FBE coefficients. This operation includes first selecting an initial equalizer delay value (step 1502). Then, for the particular equalizer delay value (FBE delay), the operation includes calculating a set of FFE coefficients and FBE coefficients (step 1504). Then operation then includes determining the FBE tap energy for the particular FBE delay (step 1506). The operation then includes storing the FFE coefficients, the FBE coefficients, and the FBE tap energy along with the particular FBE delay (step 1508). It is next determined whether the FBE delay is at a maximum (step 1510). If so, the FFE coefficients, FBE coefficients, and FBE delay is selected that corresponds to a minimum FBE tap energy (step 1516) of all solutions that have been stored. If the FBE delay is not at the maximum FBE delay (as determined at step 1510), the equalizer delay is increased by a step size (or otherwise altered as may be appropriate for the given operations) at step 1512 and operation returns to step 1504.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for computing Decision Feedback Equalizer (DFE) coefficients, the method comprising:
    estimating the channel response of a channel operated upon by the DFE;
    formulating a solution that, when solved, will yield the DFE coefficients, wherein the solution is formulated as a least squares problem that is based upon the channel response;
    solving the least squares problem to yield Feed Forward Equalizer (FFE) coefficients of the DFE coefficients, wherein solving the least squares problems includes:
    selecting a delay of the DFE;
    when the delay is less than or equal to a number of taps of the FFE minus one, performing a first set of operations; and
    when the delay is greater than the number of taps of the FFE minus one, performing a second set of operations; and
    convolving the FFE coefficients with a convolution matrix that is based upon the channel response to yield Feed Back Equalizer (FBE) coefficients of the DFE coefficients.

2. The method of claim 1, wherein the least squares problem is formulated as a Kalman gain solution.

3. The method of claim 2, wherein the Kalman gain solution is determined using a Fast Transversal Filter (FTF) algorithm.

4. The method of claim 3, wherein when the DFE delay is chosen to be less than or equal to a number of taps of the FFE minus one, a length of the FBE is chosen to force the FTF algorithm to use a lower triangular matrix.

5. The method of claim 1, wherein determining the delay of the DFE includes:
    determining a delay of the channel based upon the channel response of the channel; and
    adding the delay of the channel to the number of taps of the FFE minus one to produce the delay of the DFE.

6. The method of claim 5, wherein the delay of the channel is selected as the length of the precursor of the channel response.

7. The method of claim 1, wherein determining the delay of the DFE includes:
    calculating a plurality of sets of FFE coefficients and FBE coefficients, wherein each of the plurality of sets of FFE coefficients and FBE coefficients corresponds to a respective DFE delay; and
    selecting one of the plurality of sets of FFE coefficients and FBE coefficients based upon the tap energy of the respective FBE coefficients.

8. The method of claim 7, wherein selecting one of the plurality of sets of FFE coefficients and FBE coefficients based upon the tap energy of the respective FBE coefficients comprises selecting a set of FFE coefficients and FBE coefficients that meets an FBE coefficient tap energy threshold.

9. The method of claim 7, wherein selecting one of the plurality of sets of FFE coefficients and FBE coefficients based upon the tap energy of the respective FBE coefficients comprises selecting a set of FFE coefficients and FBE coefficients that provides a minimum FBE coefficient tap energy.

10. The method of claim 1, wherein in convolving the FFE coefficients with the convolution matrix that is based upon the channel response to yield the FBE coefficients of the DFE coefficients, the method further comprises:
    extending a convolution matrix created based upon the channel response to a bigger circulant matrix; and
    performing the convolution in a transformed domain.

11. The method of claim 10, wherein the transformed domain is selected from the group consisting of the frequency domain, the Discrete Cosine Transform domain and the Discrete Hadamard Transform domain.

12. The method of claim 1, wherein in convolving the FFE coefficients with the convolution matrix that is based upon the channel response to yield the FBE coefficients of the DFE coefficients, the method further comprises:
    extending a convolution matrix created based upon the channel response to a bigger circulant matrix; and
    computing the convolution in the frequency domain.

13. The method of claim 12, wherein computing the convolution in the frequency domain includes:
    transforming the convolution matrix and the FFE coefficients from the time domain to the frequency domain using a Fast Fourier Transform;
    computing the convolution in the frequency domain to produce the FBE coefficients; and
    transforming the FBE coefficients from the frequency domain to the time domain.

14. The method of claim 1, wherein the channel response is based upon a known preamble sequence of a packet upon which the DFE operates.

15. The method of claim 1, wherein the channel response is based upon decisions made for data carried in a packet.

16. The method of claim 1, wherein the channel response is based upon:
    a known training sequence contained in a packet preamble; and
    decisions made for data carried in the packet.

17. The method of claim 1, wherein the FFE and the FBE of the DFE are symbol spaced.

18. The method of claim 1, wherein the FFE and the FBE of the DFE are fractionally symbol spaced.

19. The method of claim 1, wherein the method is applied within a Digital Television Broadcast system.

20. The method of claim 1, wherein the method is applied within a Satellite communication system.

21. A method for computing Decision Feedback Equalizer (DFE) coefficients, the method comprising:
    estimating the channel response of a channel operated upon by the DFE;
    formulating a solution that, when solved, will yield the DFE coefficients, wherein the solution is formulated as a least squares problem that is based upon the channel response;
    solving the least squares problem using a Kalman gain solution to yield Feed Forward Equalizer (FFE) coefficients of the DFE coefficients using a Fast Transversal Filter (FTF) algorithm, wherein solving the least squares problems includes:
    selecting a delay of the DFE;
    when the delay is less than or equal to a number of taps of the FFE minus one, performing a first set of operations; and
    when the delay is greater than the number of taps of the FFE minus one, performing a second set of operations; and
    convolving the FFE coefficients with a convolution matrix that is based upon the channel response to yield Feed Back Equalizer (FBE) coefficients of the DFE coefficients.

22. The method of claim 21, wherein when the DFE delay is chosen to be less than or equal to a number of taps of the FFE minus one, a length of the FBE is chosen to force the FTF algorithm to use a lower triangular matrix.

23. The method of claim 21, wherein determining the delay of the DFE includes:
    determining a delay of the channel based upon the channel response of the channel; and
    adding the delay of the channel to the number of taps of the FFE minus one to produce the delay of the DFE.

24. The method of claim 23, wherein the delay of the channel is selected as the length of the precursor of the channel response.

25. The method of claim 21, wherein determining the delay of the DFE includes:
    calculating a plurality of sets of FFE coefficients and FBE coefficients, wherein each of the plurality of sets of FFE coefficients and FBE coefficients corresponds to a respective DFE delay; and
    selecting one of the plurality of sets of FFE coefficients and FBE coefficients based upon the tap energy of the respective FBE coefficients.

26. The method of claim 25, wherein selecting one of the plurality of sets of FFE coefficients and FBE coefficients based upon the tap energy of the respective FBE coefficients comprises selecting a set of FFE coefficients and FBE coefficients that meets an FBE coefficient tap energy threshold.

27. The method of claim 25, wherein selecting one of the plurality of sets of FFE coefficients and FBE coefficients based upon the tap energy of the respective FBE coefficients comprises selecting a set of FFE coefficients and FBE coefficients that provides a minimum FBE coefficient tap energy.

28. The method of claim 21, wherein the FFE and the FBE of the DFE are symbol spaced.

29. The method of claim 21, wherein the FFE and the FBE of the DFE are fractionally symbol spaced.

30. The method of claim 21, wherein the method is applied within a Digital Television Broadcast system.

31. The method of claim 21, wherein the method is applied within a Satellite communication system.

32. A method for computing Decision Feedback Equalizer (DFE) coefficients, the method comprising:
    estimating the channel response of a channel operated upon by the DFE;
    formulating a solution that, when solved, will yield the DFE coefficients, wherein the solution is formulated as a least squares problem that is based upon the channel response;
    for each of a plurality of FBE delays, solving the least squares problem to yield a set of Feed Forward Equalizer (FFE) coefficients and Feed Back Equalizer (FBE) coefficients of the DFE coefficients, wherein each set of FFE coefficients and FBE coefficients corresponds to a respective FBE delay; and
    selecting an FBE delay and a corresponding set of FFE coefficients and FBE coefficients based upon the tap energy of the FBE coefficients of the set.

33. The method of claim 31, wherein selecting a set of FFE coefficients and FBE coefficients based upon the tap energy of the FBE coefficients of the set comprises selecting a set of FFE coefficients and FBE coefficients that meets an FBE coefficient tap energy threshold.

34. The method of claim 31, wherein selecting a set of FFE coefficients and FBE coefficients based upon the tap energy of the FBE coefficients of the set comprises selecting a set of FFE coefficients and FBE coefficients that provides a minimum FBE coefficient tap energy.

* * * * *